US012671647B2

(12) United States Patent
Anose et al.

(10) Patent No.: US 12,671,647 B2
(45) Date of Patent: Jun. 30, 2026

(54) STATE-BASED STREAM DISTRIBUTION AND ROUTING FOR INTELLIGENT RESOURCE ALLOCATION IN MULTI-SENSOR SYSTEMS AND APPLICATIONS

(71) Applicant: Nvidia Corporation, Santa Clara, CA (US)

(72) Inventors: Benedict Anose, San Jose, CA (US); Roopa Prabhu, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 57 days.

(21) Appl. No.: 18/641,945

(22) Filed: Apr. 22, 2024

(65) Prior Publication Data

US 2025/0330416 A1 Oct. 23, 2025

(51) Int. Cl.
*H04L 45/02* (2022.01)
(52) U.S. Cl.
CPC .................................... *H04L 45/02* (2013.01)
(58) Field of Classification Search
CPC ................................. H04L 45/02; G06F 9/542
See application file for complete search history.

(56) References Cited

U.S. PATENT DOCUMENTS

| | | | | |
|---|---|---|---|---|
| 2022/0247803 A1* | 8/2022 | Trocki | ................. | H04L 65/612 |
| 2022/0413923 A1* | 12/2022 | Mukkamala | ........... | G06F 9/547 |
| 2023/0038335 A1* | 2/2023 | Edamadaka | ......... | G06Q 10/103 |
| 2025/0047588 A1* | 2/2025 | West | .................... | H04L 47/808 |

* cited by examiner

*Primary Examiner* — Chirag R Patel
(74) *Attorney, Agent, or Firm* — Hogan Lovells US LLP

(57) ABSTRACT

Approaches presented herein relate to the distribution and processing of stream data in a networked computing environment. A set of streaming data sources can be identified for a given cluster of nodes and the data from those data sources can be tracked, managed, and/or routed to a number of different microservices. Stream distribution and routing (SDR) agents may be used to manage a routing table that includes an identifier for each of the data sources. The individual agents may distribute information about the sensors to individual microservices, which may determine which data streams are relevant and then initiate individual processes and functions using the relevant data streams. Output results from the individual microservices may also be assigned an identifier, which may further be used by the individual agents to route outputs toward their particular microservices, which may then use the outputs from other microservices within their own workstreams.

20 Claims, 18 Drawing Sheets

Figure 6:
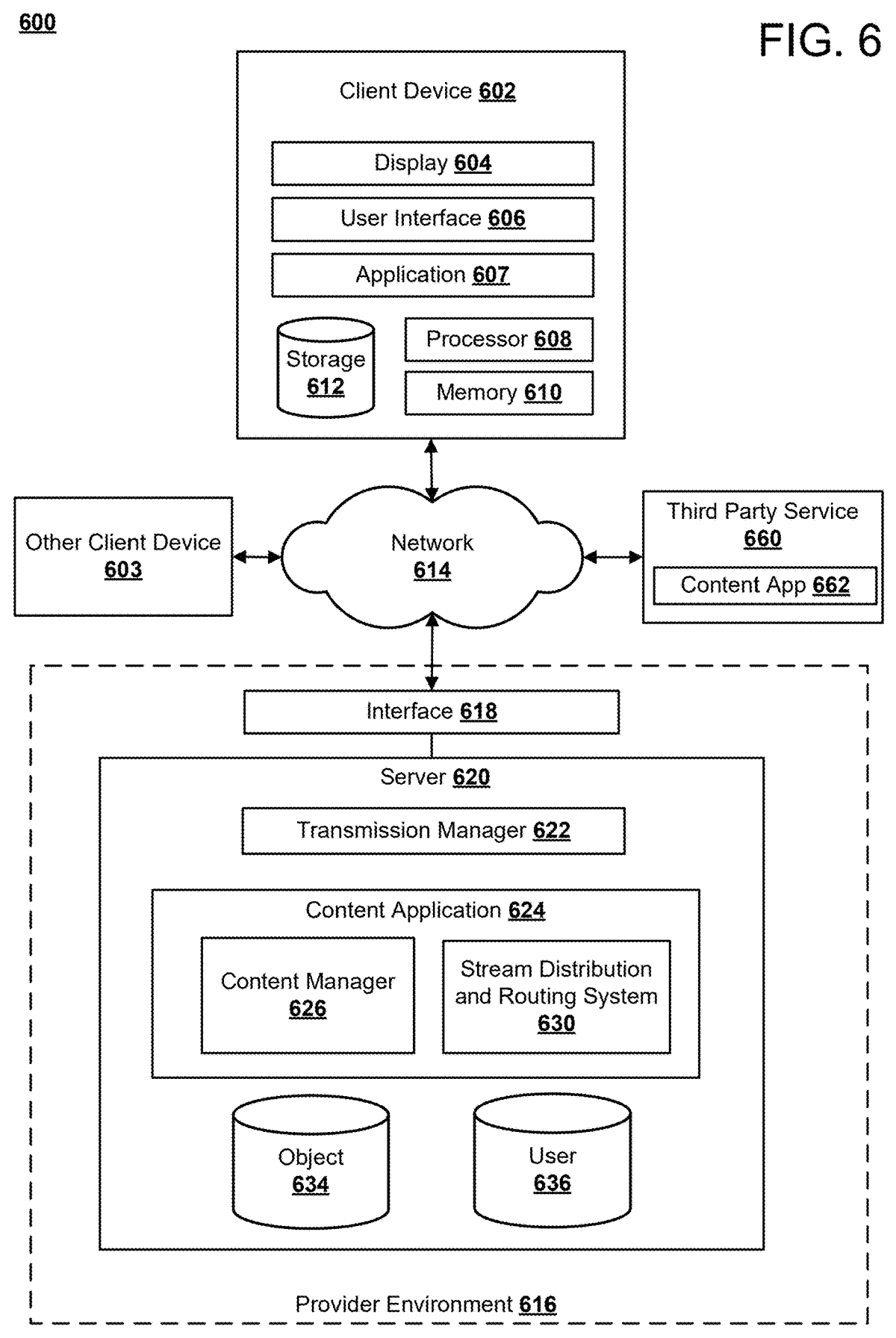

Client Device 602

Display 604

User Interface 606

Application 607

Storage 612

Processor 608

Memory 610

Other Client Device 603

Network 614

Third Party Service 660

Content App 662

Interface 618

Server 620

Transmission Manager 622

Content Application 624

Content Manager 626

Stream Distribution and Routing System 630

Object 634

User 636

Provider Environment 616

DATA CENTER
700

SOC INTEGRATED
CIRCUIT
1200

APPLICATION
PROCESSOR(S)
1205

715

GRAPHICS
PROCESSOR
1210

715

IMAGE
PROCESSOR
1215

715

VIDEO
PROCESSOR
1220

715

USB
1225

UART
1230

SPI/SDIO
1235

$I^2S/I^2C$
1240

DISPLAY
1245

SECURITY
ENGINE
1270

MEMORY
CON-
TROLLER
1265

FLASH
1260

MIPI
1255

HDMI
1250

GRAPHICS
PROCESSOR
1310

VERTEX PROCESSOR
1305

614

FRAGMENT
PROCESSOR
1315A

614

FRAGMENT
PROCESSOR
1315C

614

FRAGMENT
PROCESSOR
1315N-1

614

FRAGMENT
PROCESSOR
1315B

614

FRAGMENT
PROCESSOR
1315D

614

FRAGMENT
PROCESSOR
1315N

614

MMU
1320A

MMU
1320B

CACHE
1325A

CACHE
1325B

INTERCONNECT
1330A

INTERCONNECT
1330B

GRAPHICS
PROCESSOR
1340

STATE-BASED STREAM DISTRIBUTION AND ROUTING FOR INTELLIGENT RESOURCE ALLOCATION IN MULTI-SENSOR SYSTEMS AND APPLICATIONS

BACKGROUND

Distributed computing offers a powerful approach to performing complex tasks, such as those that relate to processing and managing large-scale data. Such an approach leverages a network of interconnected computers that collaborate to process data by distributing the workload across multiple nodes to enhance efficiency and speed. A critical component of various approaches to distributed computing is a container orchestration platform, such as Kubernetes. These platforms manage distributed computing by automating the deployment, scaling, and management of containerized applications within a distributed network. Distributed computing can be used to process stream data such as data from sensor-based systems, which may require real-time analysis and coordination of stream data from a multitude of sensors. In such systems, efficiently managing continuous data streams from each independent sensor poses a challenge that traditional computing models may struggle to address.

BRIEF DESCRIPTION OF THE DRAWINGS

Various embodiments in accordance with the present disclosure will be described with reference to the drawings, in which:

FIG. 6 illustrates an example system environment that includes a stream distribution and routing system, according to at least one embodiment;

DETAILED DESCRIPTION

Figure 1:
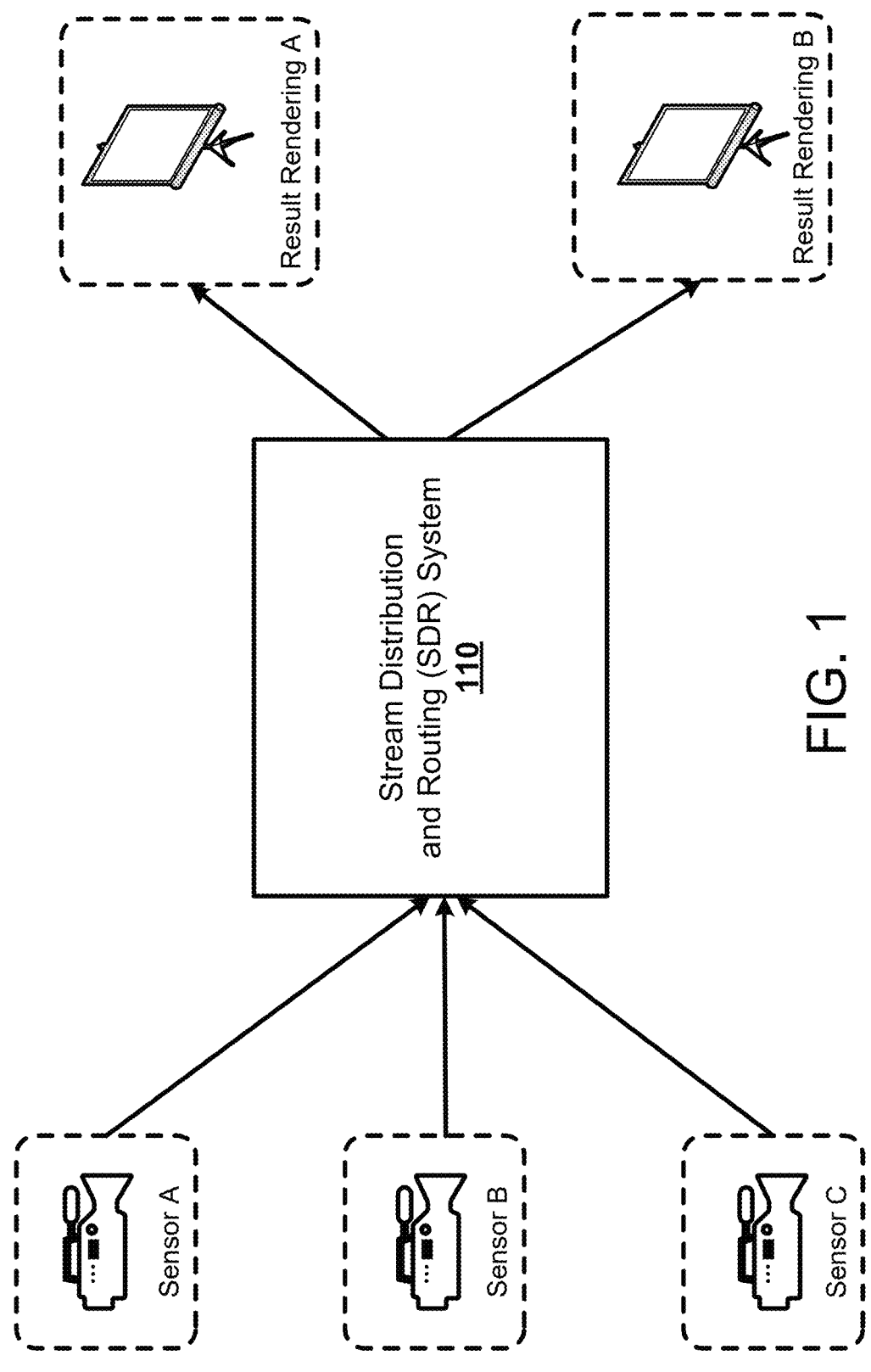
FIG. 1 illustrates an example scenario for using a stream distribution and routing (SDR) system to provide rendered results, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Approaches in accordance with various embodiments of the disclosure are directed toward the distribution and routing of streams of data. For example, a stream distribution and routing (SDR) system, in accordance with at least one embodiment, can distribute and process streams of data in a networked computer or "cloud" environment. Such a system can identify a set of streaming data sources for a given cluster of nodes (such as computers, servers, or other computing devices) and then track, manage, and route the data from those data sources to a number of different microservices associated with cluster of nodes. An initiator may publish information of individual data sources (e.g., sensors) to a bus, and provide at least one message to one or more agents each associated with one or more particular microservices. The agents may be used to manage (e.g., maintain, update, etc.) a state-based data structure, such as a routing table (or may be referred to as a route entry table), that includes an identifier for each of the data sources. The individual agents may then distribute information about the data sources to their individual microservices, which may determine which data streams are relevant to those microservices. The microservices can then initiate individual processes and functions using the relevant data streams. In certain embodiments, outputs from the individual microservices may also be assigned identifiers, which may further be used by the individual agents to route the outputs toward their particular microservices, which may then use the outputs (from other microservices) within their own workstreams. In this manner, individual clusters of nodes may identify, track, and use different data sources within groups of microservices managed by individual agents.

Approaches in accordance with at least one embodiment may provide several technical advantages and improvements. For example, the stream distribution and routing system, in accordance with at least one embodiment, can efficiently process multiple continuous and real-time data streams. Conventional systems, which are typically transaction-based, often face challenges in handling continuous data stream in real time. For example, traditional computing models require coordination in distributed systems through the sending and processing of individual requests, which is not well-suited to continuous stream processing that demands uninterrupted and ongoing data handling. The stream distribution and routing system overcomes this challenge by managing multiple ongoing processes concurrently with tracked state or status for each process and data stream. The system can dynamically identify and allocate resources for each data stream through a routing table. Using such a routing table, the stream distribution and routing system may provide a comprehensive understanding of which process is handling which stream at a given moment, which advantageously facilitates parallel processing and tracking in a continuously operating environment.

Further, the stream distribution and routing system, in accordance with at least one embodiment, can provide a streamlined process for adding new functions, such as microservices, with reduced coding requirements. This can be achieved through the integration of one or more SDR (stream distribution and routing) agents into the SDR system. For example, if a user aims to add new features to an existing network cluster, the user can create a new function, and the SDR system will attach an SDR agent to a corresponding workload object that is configured to perform the new function. The system can simplify the deployment of various functionalities or microservices and acts as a robust backend component that improves large-scale computing capabilities. Conventional systems, on the other hand, when introducing new features or services often involve coding and reconfiguration to several interdependent components, which makes each addition a potential risk for introducing errors or incompatibilities. As a result, approaches for stream distribution and routing as disclosed herein offer solutions for agile development and deployment with rapid scalability and adaptability in response to evolving data processing needs. Such approaches may ensure that new services can be dynamically integrated and existing ones can be efficiently updated.

Furthermore, approaches to stream distribution and routing as disclosed herein can optimize the efficiency of resource usage by managing stream density and resource allocation throughout the network. For example, the SDR system may achieve this by intelligently assigning data streams across the suite of available microservices or pods in workload objects. The SDR system may dynamically allocate streams to workload objects based on maximum capacity requirements of each associated workload object by routinely recalculating performance metrics (such as utilized capacity), which allows for the optimization of stream density across the network. To support system reliability, the SDR system may maintain a minimum number of spare replicas that can take over processing if an active pod fails. The SDR system may improve reliability by monitoring for anomalies or failures within the network, such as downed processes, offline nodes, or stale stream identifiers. Additionally, the SDR system may include mechanisms for reconciling stale stream identifiers with the initiator. This is accomplished by having each initiator to maintain a current list of active stream identifiers, which ensures that the routing system remains up-to-date with the actual state of the network. Such mechanisms ensure that data processing is both current and accurate, which reduces the risk of data loss or processing delays and maintains the integrity and continuity of the data streams within the distributed computing environment.

Variations of this and other such functionality can be used as well within the scope of the various embodiments as would be apparent to one of ordinary skill in the art in light of the teachings and suggestions contained herein.

FIG. 1 presents an illustrative diagram of a stream distribution and routing (SDR) system 110 in accordance with at least one embodiment. In this example, the SDR system 110 is illustrated to interface with a network of sensors within a Kubernetes cluster. The SDR system 110 can receive real-time data streams from various sensors, such as sensor A, sensor B, and sensor C. These sensors may correspond to any of a diverse range of devices, such as video cameras or radar systems, which may each stream data (live or otherwise) to be processed by the SDR system 110. The SDR system 110 may dynamically distribute these streams to appropriate workload objects (which may be referred to herein as workers) within the cluster. These workload objects can correspond to various microservices selected to perform specific functions on the incoming data streams. In the example scenario illustrated in FIG. 1, sensor A, sensor B, and sensor C may represent, as an example, high-definition cameras deployed throughout a secured facility. Each sensor may be tasked with continuously monitoring different critical areas. In one embodiment, an initiator, such as a Video Storage Toolkit (VST) in a security system, may activate or deactivate sensors (e.g., cameras) and their respective streams. Each camera can be assigned a unique identifier and can generate and stream real-time video data. The initiator may generate an event message in a specific format including unique identifier(s) to activate or deactivate corresponding sensor(s) and announce the message through a configuration control bus. Upon detecting this message, SDR agents may pick up the message and allocate the stream to a suitable pod of a workload object capable of handling it. In one embodiment, the SDR system 110 may process video streams in real time and route them to designated microservices for specific processing, such as AI inferencing (e.g., motion detection or object recognition). The SDR agents may then configure corresponding workload objects to process the video streams from the cameras and record mappings in a routing table. For example, the routing table may record a mapping of a unique identifier of a camera (e.g., stream ID of the camera) to a unique identifier of a pod (e.g., IP address of the pod). After processing by the workload objects, results are forwarded to different result producing or rendering endpoints, such as result rendering A and result rendering B, which may be visual displays or other forms of result production that provide users with real-time processed information, such as identified threats or tracking movements.

Figure 2:
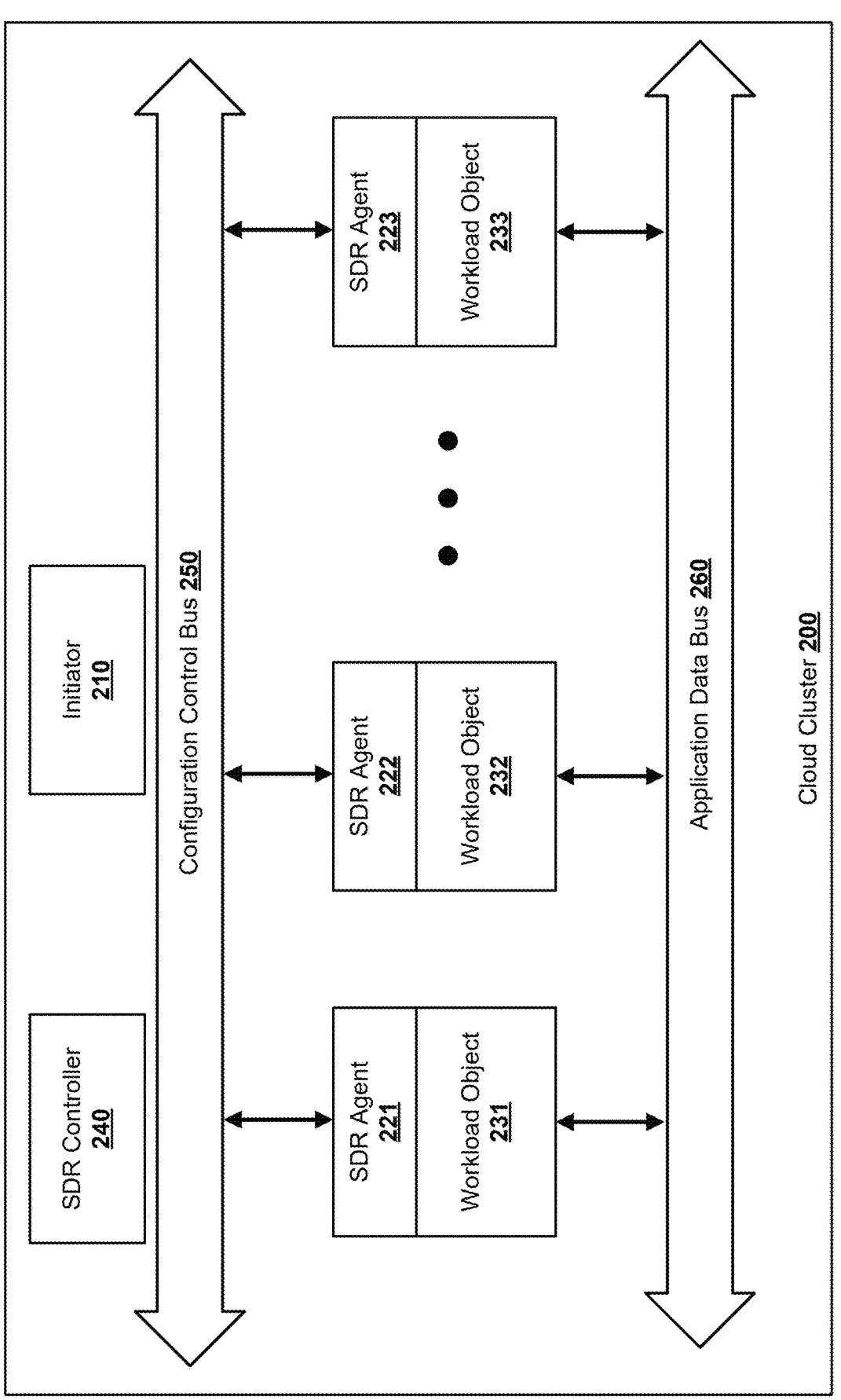
FIG. 2 is a diagram that illustrates components in an example stream distribution and routing system, according to at least one embodiment.

FIG. 2 illustrates an example SDR system within a cloud cluster 200 in accordance with at least one embodiment. The example SDR system may include an SDR controller 240, an initiator 210, a configuration control bus 250, an application data bus 260, and a number of SDR agents 221, 222, and 223, with each SDR agent associated with a respective workload object such as workload objects 231, 232, and 233. These components of the SDR system are discussed in further detail below.

The initiator 210 may correspond to, or perform, a process or function hosted in a cluster that maintains a list of sensors and manages state or status corresponding to each sensor. The initiator 210 may activate or deactivate one, some, or all sensors (and their respective streams). In one embodiment, the initiator 210 may communicate with, via the configuration control bus 250, the SDR agents 221, 222, 223 using messages that follow or have a pre-determined message format (e.g., a JSON file with specific fields). The initiator 210 may dispatch these structured messages that encapsulate information associated with each data source. Each message may include information such as the type of sensor, one or more unique identifiers, and metadata describing the nature and requirements of the data stream. An example message may follow or have the following format:

"sensor": {"alert_type": "camera_status_change", "created_at": "2023-03-10T00:45:16Z", "event": {"camera_id": "302547 db-d661-4fb0-9e46-62b7420da904", "camera_name": "front_door", "camera_url": "rtsp:// <camera-ip-address>/ . . . ", "change": "camera_add or camera_remove", "metadata": {"resolution": "1920× 1080", "codec": "h264", "framerate": 30}, "headers": {"source": "vst", "created_at": "2021-06-01 T14: 34: 13.417 Z"}}

For example, as illustrated in the example message, when integrating a new set of surveillance cameras within a security network, the initiator 210 may publish a message containing information such as camera type, a unique stream ID (identifier) for each camera, resolution details, frame rate, and the specific codec used for video encoding. In one embodiment, the initiator may assign a unique stream ID to each data stream (such as a camera_id) along with any other necessary metadata (e.g., event field in the example message). The message may be published to the configuration control bus 250, where the message is made available for the SDR agents to pick up. This message may be announced by the configuration control bus 250 to notify the SDR agents to pick up the messages. The SDR agents, when receiving the message, may route the stream data to microservices (e.g., pods in workload objects in a Kubernetes environment) suitable for specific tasks such as AI inferencing, object recognition or movement tracking.

The workload objects 231, 232, and 233 can correspond to processing entities within a distributed cluster of nodes. As used herein, a workload object may refer to a high-level abstraction that represents a set of applications or microservices that are being run on the cluster. These workload objects can be tasked with executing specific functions/ microservices and generating outputs through the processing of data streams. In one embodiment, workload objects may be instantiated as process replicas (commonly referred to as pods within the Kubernetes environment). That is, each workload object may manage a plurality of processes run by a plurality of pods corresponding to the workload object. Each pod may be uniquely identifiable within the network (e.g., associated with an IP address). In one embodiment, SDR agents may attach data streams to appropriate workload objects and record the mapping of corresponding stream identifiers to corresponding pod IP addresses in a routing table that maps each data stream to its designated pod (and, by extension, workload object). Each workload object may further maintain a configurable threshold for the maximum number of concurrent data streams that the workload object can efficiently handle. The SDR agents and workload objects are discussed in greater detail in accordance with FIG. 3.

The SDR controller 240 may manage numerous aspects of the SDR agents 221, 222, 223 within the SDR system. For example, the SDR controller 240 may manage the interactions of SDR agents and the distributed network of microservices. For another example, the SDR controller 240 may handle the initial launch of SDR agents in the cluster. The SDR controller 240 may also maintain configuration data for each SDR agent such as keeping track of information including connection ports for each SDR agent and maximum capacity for each workload object associated with the agent. In one embodiment, the SDR controller 240 may dynamically adjust the workload distribution based on real-time analytics and performance metrics. The SDR controller 240 may continuously monitor the status of each SDR agent and their corresponding workload objects such as monitoring stream density for each workload object. The SDR controller 240 may also perform automatic scaling actions, such as provisioning additional pods when a particular service is reaching its maximum capacity or when an influx of data streams is detected. The SDR controller 240 may ensure that no single microservice is overwhelmed with excessive load, which could compromise processing efficiency and speed. For example, if there is a surge in video data from a fleet of newly deployed traffic drones, the SDR controller 240 may analyze the current load and may decide to spin up additional processing pods to keep up with the increased demand. The SDR controller 240 may also ensure redundancy by maintaining a pool of spare replicas that ready to be deployed if an active pod fails to provide fault tolerance. In addition to managing system resources, the SDR controller 240 may also perform tasks related to error detection and recovery. The SDR controller 240 may actively scan for and identify issues such as pod failures or network anomalies and promptly communicate with the configuration control bus 250 to initiate corrective actions. By reconciling the active stream identifiers with the initiator 210, the SDR controller 240 may ensure that data processing capabilities are aligned with the actual operational needs.

The SDR agents 221, 222, 223 can attach to workload objects and build or update a routing table that maintains the mapping of streams to workload objects. Upon receiving an activation message from the initiator 210, an SDR agent may identify a suitable workload objector, in some embodiments, a suitable pod, that has the capacity to process the incoming stream. The SDR agents may manage (e.g., maintain, update, etc.) the route entry table, where stream identifiers are mapped to pod addresses. The SDR agents may also enable communication between different workload objects by routing requests to the specific pods tasked with handling streams associated with specific stream identifiers. The SDR agents achieve this by calling functions to the corresponding pod within the network. To facilitate this targeted routing, calling functions may also include the stream identifier within the header of their requests. Functionalities related to the SDR agents are discussed in greater detail in accordance with FIG. 3.

Figure 3:
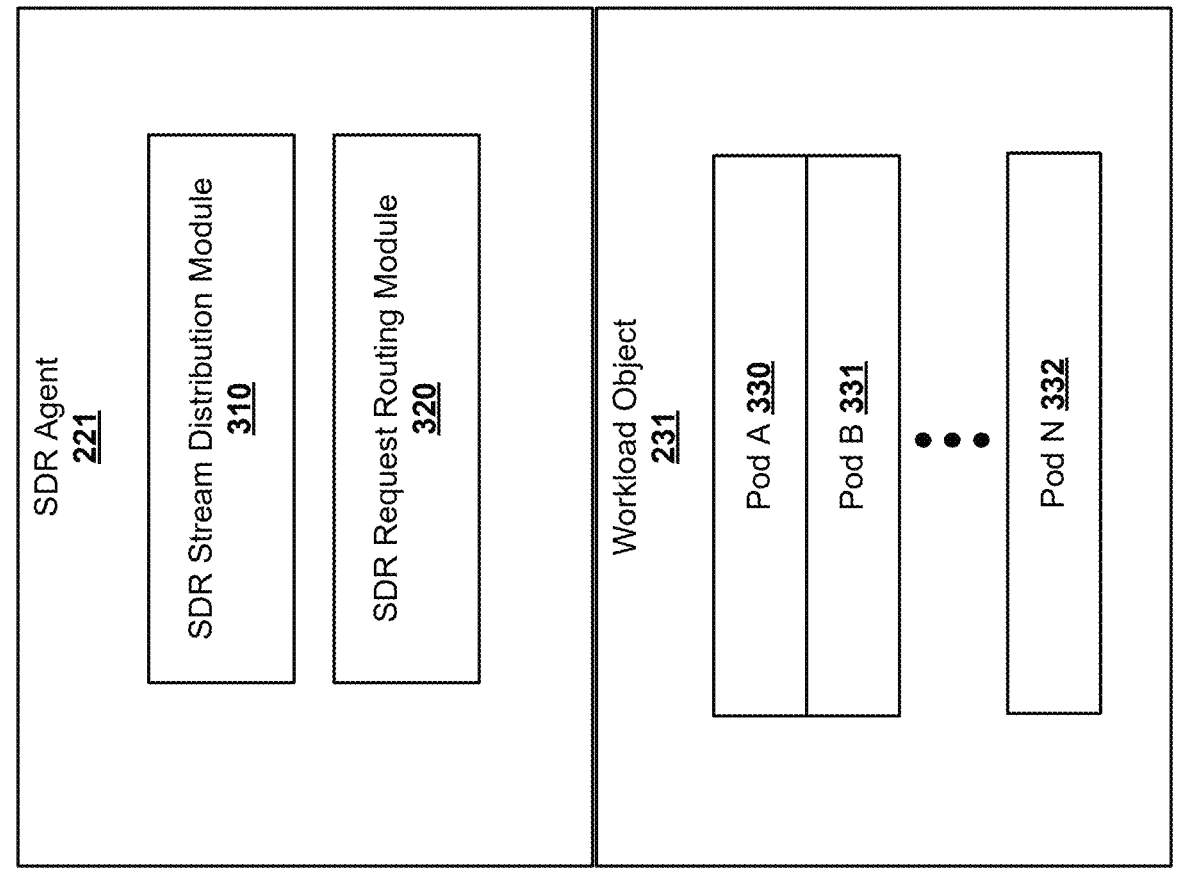
FIG. 3 illustrates an example SDR agent and an example workload object, according to at least one embodiment.

FIG. 3 illustrates an example SDR agent attached to at least one workload object, in accordance with at least one embodiment. The example SDR agent shown in FIG. 3 is the SDR agent 221, which is associated with one workload object (i.e., the workload object 231). Other SDR agents in the system may be similarly configured as the SDR agent 221. The SDR agent 221 may include an SDR stream distribution module 310 that distributes streams to corresponding workload objects and an SDR request routing module 320 that routes requests to corresponding pods in the cluster. The workload object 231 may manage one or more pods such as pod A 330, pod B 331, and pod N 332. A pod, as used herein, may refer to a deployable unit in container orchestration platforms (e.g., Kubernetes). A pod may contain one or more containers that share storage, network, and a specification on how to run the containers. Each workload object may manage one or more pods where the actual processes or microservices run. A workload object may maintain the state and characteristics of these pods, such as the number of replicas, the container images to use, and the networking rules. Each workload object may be attached to an SDR agent that manages the communication between workload objects and other components in the system.

The SDR stream distribution module 310 may perform the initial processing of data streams as the streams enter the system. Upon receipt of an activation message from an initiator (e.g., the initiator 210 of FIG. 2), the SDR stream distribution module 310 may identify the workload object 231 as having available capacity to process the incoming stream and update the route entry table accordingly (e.g., an entry indicating the stream identifier and the address of a processing pod). In one embodiment, the route entry table may be implemented using a Redis database, which allows for the dynamic and efficient routing of streams within the system. Other various Message-Oriented Middleware (MOM) software or hardware infrastructure supporting sending and receiving messages between distributed systems can also be used, such as Apache Kafka, for high-throughput stream processing, RabbitMQ for flexible messaging queuing, ZeroMQ for low-latency asynchronous messaging, and in-memory data grids like Hazelcast for distributed data management offer scalable solutions for complex routing needs. Additionally, hardware-based approaches, including programmable network switches or custom-designed FPGAs and ASICs, can provide efficient data routing capabilities.

The SDR stream distribution module 310 may then facilitate the transfer of a data payload to the workload object 231 and initiate the processing. In one embodiment, workload objects may support RESTful (representational state transfer) operations for "add" and "delete" operations for the dynamic modification of the processing tasks. If such operations are not configured on a workload object, the SDR stream distribution module 310 may allocate the stream to a pod and record this mapping in the route entry table to track an identifier of the stream (e.g., the stream identifier) for ongoing processing activities. Additionally, to maintain service continuity and scalability, the SDR stream distribution module 310 may instantiate new workload processes (e.g., pods) when the current capacity is reached to ensure that there is no interruption to the data stream processing capabilities of the system. After stream data is processed and results are generated, the SDR stream distribution module 310 may also assign a result identifier to the generated results and store this mapping in the route entry table. The generated results may be utilized by other microservices by retrieving the results using the result identifier. In one embodiment, the route entry table is a global database where each SDR agent can update, query, and retrieve related result associated with an identifier or an IP address. Furthermore, to ensure the integrity and consistency of data within the route entry table, especially in scenarios involving concurrent write or read operations, the invention employs a write-read lock mechanism for each record to prevent operational interruptions and maintain data consistency across the system.

To demonstrate the stream distribution process with an example, an SDR system can be considered where an initiator triggers the activation/deactivation of sensors (and their respective streams). The initiator may perform sensor addition and removal operations by issuing messages (e.g., JSON messages) with a unique stream identifier to a configuration control bus, which subsequently announces these messages to the system. An SDR agent may pick up such a message from the configuration control bus and, based on the content of the message, identify an available pod within the cloud environment that has the capacity to process the incoming data stream. Upon successful identification, the SDR agent may update a route entry table by including a mapping of the stream identifier to the IP address of the workload object. The corresponding workload object may be notified of the incoming data stream via a RESTful interface. The workload object is then configured to perform the microservices and execute the necessary functions on the data stream.

The SDR request routing module 320 may manage the dynamic allocation of data streams to workload objects or pods within a cloud-based infrastructure. The SDR request routing module 320 may receive incoming service requests from other SDR agents and direct the requests to corresponding pods indicated in the request. In one embodiment, the SDR request routing module may utilize APIs (application programming interface) for routing requests among microservices, such as Envoy XDS that includes LDS (Listener Discovery Service), RDS (Route Discovery Service), CDS (Cluster Discovery Service), and EDS (Endpoint Discovery Service). These APIs allow Envoy XDS to dynamically receive configuration updates without needing to restart. Each service request may be identified by a unique stream identifier encapsulated within the message header. The SDR request routing module 320 may leverage the stream identifier to locate a specific pod among potentially numerous pods within the Kubernetes cluster, with the specific pod designated to process the specific data stream associated with the service request.

To illustrate the request routing process in an SDR system with an example, the service request routing operation within the SDR system is initiated when a service request, conveyed through HTTP (Hypertext Transfer Protocol) or RPC (Remote Procedure Calls, such as gRPC by Google), is received. The request may include a specific stream identifier corresponding to the stream associated with the request. An SDR request routing module may look up in a route entry table to identify the network address of the pod assigned to the stream identifier mentioned in the request header. The SDR request routing module may subsequently facilitate the transmission of a request payload to the identified pod that is responsible for the processing of the data stream. In one embodiment, the SDR request routing module may amend the routing configurations upon receiving a deactivation message from an initiator. In the scenario when a deactivation message is received, the SDR request routing module may remove the associated routing information from the route entry table. Removing disassociated entries from the route entry table timely may conserve system resources and optimize operational efficiency. In one embodiment, a request may be received to remove routing information associated with a data stream from the route entry table. Upon detecting that the data stream is used by other workload objects, the SDR request routing module 320 may determine to not delete and keep the routing information from the route entry table. When the SDR request routing module 320 detects that the data stream is not associated with any other workload objects, the SDR request routing module 320 may delete the associated entry from the route entry table.

Figure 4:
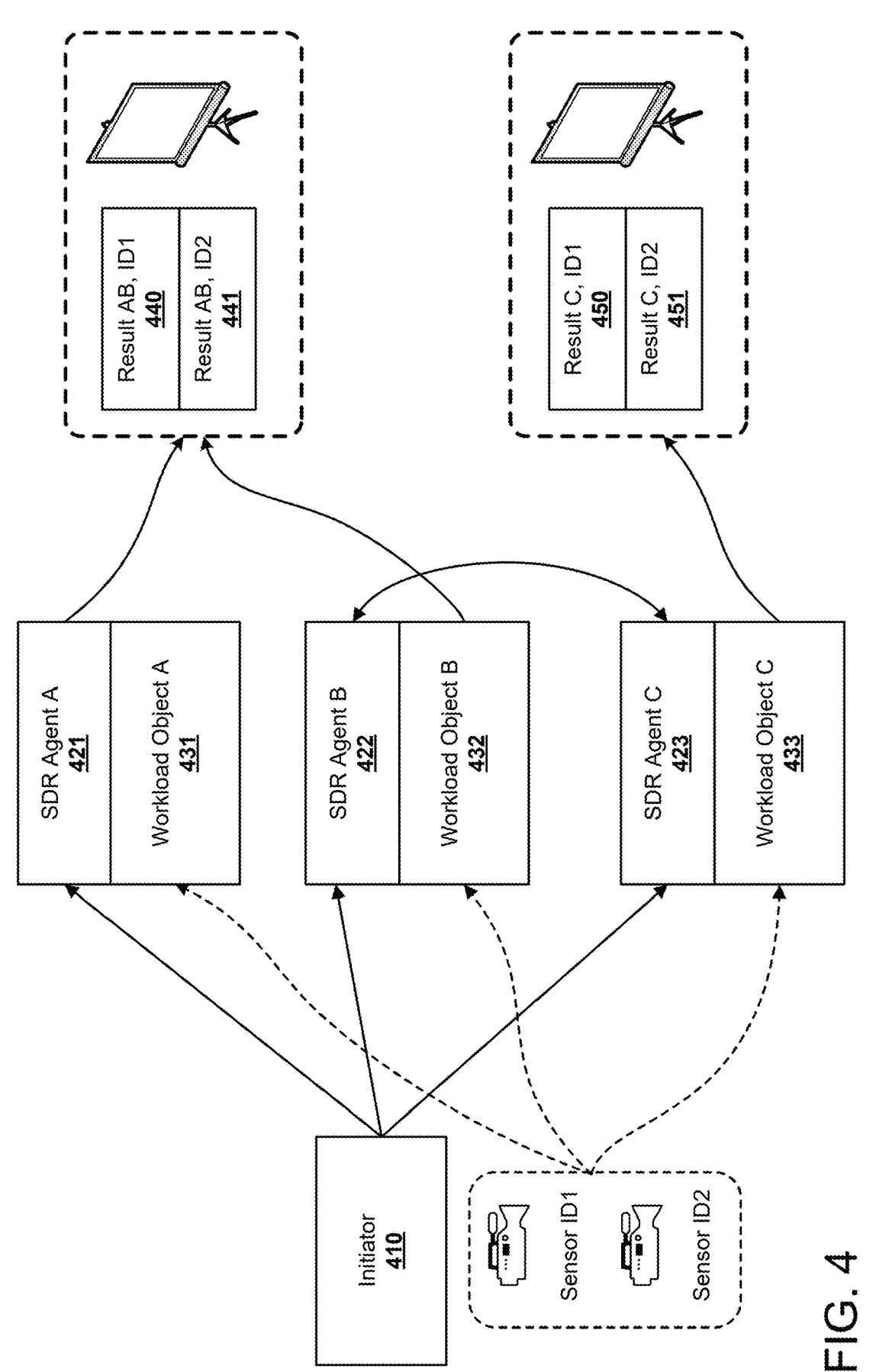
FIG. 4 illustrates example data flows in a stream distribution and routing system, according to at least one embodiment.

FIG. 4 illustrates an example operational scenario with various components for processing and rendering results based on data streams facilitated by an SDR system within a Kubernetes environment. As illustrated in FIG. 4, the process may be initiated by an initiator 410 that is capable of triggering activation/deactivation of sensors (e.g., sensor ID1 and sensor ID2) and their respective streams. The initiator 410 may send a message of a specific format to a configuration control bus, where the message is made public to SDR agents within the system. As an example, the sensors may be security cameras in a facility managed by a VST that can act as an initiator. The SDR system may comprise multiple SDR agents such as SDR agents 421, 422, and 423. The SDR agents may receive the message announced by the configuration control bus and be configured to work with microservices. Upon receipt of stream information from the initiator 410, the SDR agents leverage RESTful API calls to initiate and provision the microservice processing functions tailored for each stream. An SDR agent may find a workload object that is suitable for the stream data and record the mapping of stream identifier to the IP address of the workload object in a route entry table. For example, as illustrated in FIG. 4, each SDR agent 421, 422, and 423 is associated with a corresponding workload object, such as workload objects 431, 432, 433, and such associations are recorded in the route entry table. Outcome (e.g., output, result, etc.) of the processing tasks performed by the microservices is then transmitted to result producing or rendering endpoints.

In one embodiment, each data stream may be processed by multiple microservices. For example, result AB, ID1 440 and result AB, ID2 441 are examples of results from combined processing. For stream ID1, generated by sensor ID1, the result (AB, ID1) is produced through the collaborative efforts of workload objects A and B. Similarly, for stream ID2, the result (AB, ID2) is created by the collaborative operation of workload objects A and B. In one embodiment, microservices within a cluster can communicate with each other through an SDR requesting routing module (e.g., the SDR request routing module 320 of FIG. 3). For instance, SDR agent C, associated with workload object C, may first interact with SDR agent B, which is associated with workload object B, to obtain an output from workload object B and generate result C, producing result C, ID1 450 and result C, ID2 451. For SDR agent C to acquire results from SDR agent B, the agent may send gRPC requests with stream identifiers in the headers of the requests. Upon receiving the request, SDR agent B may identify the specific process handling the specified stream identifier, such as via a routing table, and may be configured to transmit the requested results to SDR agent C. After receiving the results, SDR agent C may then generate a composite result, such as result C, and send this result to be transmitted to an endpoint (e.g., client device) for rendering.

Figure 5:
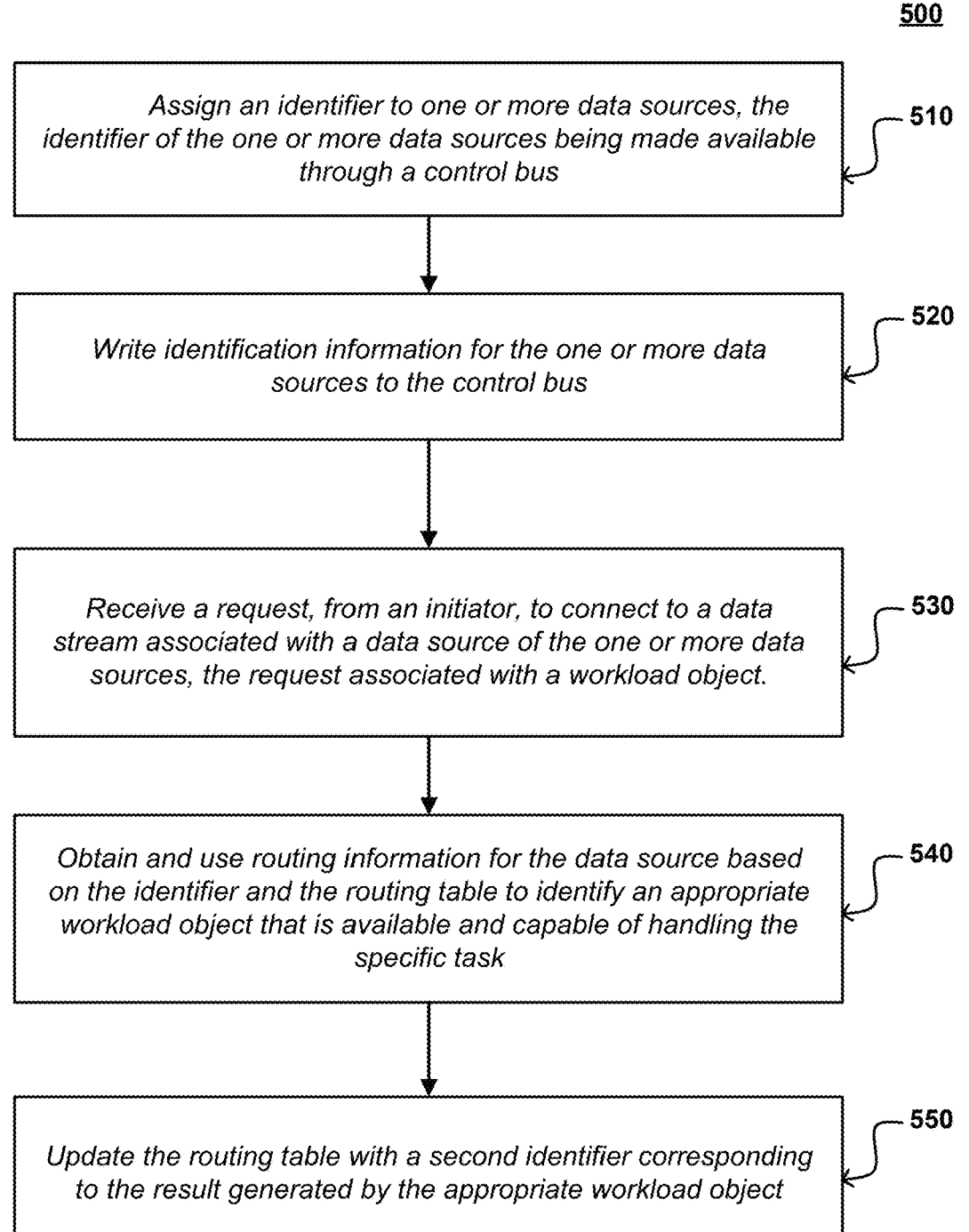
FIG. 5 illustrates an example process for distributing and routing streams using a stream distribution and routing system, according to at least one embodiment.

FIG. 5 illustrates an example process for dynamically routing and processing stream data, in accordance with at least one embodiment. The process 500 may start with an initiator assigning 510 one or more identifiers to one or more data sources in a SDR system. In one embodiment, the data source(s) may be sensors such as cameras that continuously stream data. The data source(s) can be made available through a control bus to SDR agents within the SDR system. The identification information such as the identifiers for the one or more data sources can be written 520 to a control bus which is made available to the SDR agents. One or more SDR agent may pick up a request and find a workload object for processing the data source. In one embodiment, the request may be received 530 from the initiator as a workload object payload to connect a data stream associated with a data source of the one or more data sources with a workload object, where the workload object is available and capable of handling the specific task associated with the stream, such as performing AI inferencing like object recognition or motion detection. The identifier of the data source may be obtained and used 540 by a SDR agent to identify an appropriate workload object, of a plurality of workload objects associated with the SDR agent, that is available and capable of handling the specific task. In one embodiment, the SDR agent may record this mapping between the identifier of the data source and an identifier of the appropriate workload object (e.g., workload object IP address) in a routing table. After the appropriate workload object processes the stream data and produces a result, the routing table may then be updated 550 with a second identifier such as a result identifier corresponding to the result generated by the appropriate workload object.

FIG. 6 illustrates an example system environment that includes a stream distribution and routing system, in accordance with various embodiments. As an example, FIG. 6 illustrates an example networked system 600 that can be used to provide, generate, modify, encode, process, and/or transmit data or other content. The example networked system 600 may include a client device 602, other client device 603, a network 614, a third party service 660, and a provider environment 616 that includes a stream distribution and routing system 630.

The client device 602 may generate or receive data for a session using components of an application 607 on the client device 602 and data stored locally on the client device 602. As an example, a user may utilize the client device 602 to perform stream data processing using the application 607. Although only one client device 602 is illustrated in detail, the example networked system 600 may include one or more other client devices 603 that can communicate with the provider environment 616 through the network 614. The client device 602 may be any appropriate computing device capable of enabling a user to perform tasks related to stream data processing as discussed herein, such as may include a desktop computer, notebook computer, computer workstation, gaming console, set-top box, streaming device, smartphone, tablet computer, VR headset, AR goggles, wearable computer, or a smart television. In at least one embodiment, a user can access results from stream data processing using a user interface (UI) 606 running on the client device 602, although at least some functionality may also operate on a remote device, networked device, or through a cloud computing platform. In at least one embodiment, a user can provide input to the UI 606, such as through a touch-sensitive display 604 or by moving a mouse cursor displayed on a display screen. In one embodiment, a user may be able to provide inputs such as datasets and data to the application 607. The application 607 may be provided by the provider environment 616 for the user to download on the client device 602. In at least one embodiment, the client device 602 can include at least one processor 608 (e.g., a CPU or GPU), a storage 612, and a memory 610 to execute application 607 and/or perform tasks on behalf of the application 607.

In one embodiment, the client device 602 can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

The network 614 may represent the communication pathways among the client device 602, the provider environment 616, other client device 603, and the third party service 660. Through the network 614, the client device 602 may send input information associated with stream data processing over the network 614. The information may be received by a remote computing system, as may be part of a resource provider environment 616. In one embodiment, the network 614 is the Internet. The network 614 can include any appropriate network, including an intranet, Internet, a cellular network, a local area network (LAN), or any other such network or combination, and communication over a network can be enabled via wired and/or wireless connections. The network 614 can also utilize dedicated or private communication links that are not necessarily part of the Internet. In one embodiment, the network 614 uses standard communications technologies and/or protocols. Thus, the network 614 can include links using technologies such as Ethernet, Wi-Fi, integrated services digital network (ISDN), digital subscriber lines (DSL), asynchronous transfer mode (ATM), etc. Similarly, the networking protocols used on the network 614 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, such as long term evolution (LTE). The data exchanged over the network 614 can be represented using technologies or formats including the hypertext markup language (XML), the wireless access protocol (WAP), the short message service (SMS) etc. In addition, all or some of the links can be encrypted using conventional encryption technologies such as the secure sockets layer (SSL), secure HTTP or virtual private networks (VPNs). In another embodiment, the client device 602 can use custom and/or dedicated data communications technologies instead of, or in addition to, the ones described above.

The provider environment 616 may include any appropriate components for receiving requests and returning information or performing actions in response to those requests. In the embodiment illustrated in FIG. 6, the provider environment 616 may include an interface 618, and a server 620 that include various components for performing tasks associated with stream data processing. In at least one embodiment, the provider environment 616 might include Web servers and/or application servers for receiving and processing requests, then returning data or other content or information in response to a request.

The interface 618 may receive communications to the server 620. In at least one embodiment, the interface 618 can include application programming interfaces (APIs) or other exposed interfaces enabling a user to submit requests to the server 620. In at least one embodiment, the interface 618 can include other components as well, such as at least one Web server, routing components, or load balancers. In at least one embodiment, components of an interface 618 can determine a type of request or communication, and can direct a request to an appropriate system or service such as the stream distribution and routing system 630.

The server 620 may include a transmission manager 622, a content application 624, an object repository 634, and a user database 636. The server 620 may receive requests and data from the client device 602, perform tasks associated with the requests, and send results or other data to the client device 602. In at least one embodiment, the content application 624 executing on the server 620 (e.g., a cloud server or edge server) may initiate a session associated with the client device 602, as may use a session manager and user data stored in a user database 636, and can cause content such as one or more object representations from an object repository 634 to be selected by a content manager 626 for processing. At least a portion of the generated content, such as results from stream data processing may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding application (e.g., application 607) for selecting, providing, synthesizing, modifying, or using content for presentation (or other purposes) on or by the client device 602. A decoder may also be used to decode data received over the network 614 for presentation via the client device 602, such as image or video content through a touch-sensitive display 604. In at least one embodiment, at least some of the content may already be stored on, rendered on, or accessible to the client device 602 such that transmission over the network 614 is not required for at least that portion of content, such as where the content may have been previously downloaded or stored locally on a hard drive or optical disk. In at least one embodiment, a transmission mechanism such as data streaming can be used to transfer the content from the server 620, or the user database 636, to the client device 602. In at least one embodiment, at least a portion of this content can be obtained, enhanced, and/or streamed from another source, such as a third party service 660 or other client device 603, that may also include a content application 662 for generating, enhancing, or providing content. In at least one embodiment, portions of this functionality can be performed using multiple computing devices, or multiple processors within one or more computing devices, such as may include a combination of CPUs and GPUs.

In at least one embodiment, the server 620 may include a processor such as a central processing unit (CPU). In at least one embodiment, however, resources in such environments can utilize GPUs to process data for at least certain types of requests. In at least one embodiment, with thousands of cores, GPUs are designed to handle substantial parallel workloads and, therefore, have become popular in deep learning for training neural networks and generating predictions. In at least one embodiment, while use of GPUs for offline builds has enabled faster training of larger and more complex models, generating predictions offline implies that either request-time input features cannot be used or predictions must be generated for all permutations of features and stored in a lookup table to serve real-time requests. In at least one embodiment, if a deep learning framework supports a CPU-mode and a model is small and simple enough to perform a feed-forward on a CPU with a reasonable latency, then a service on a CPU instance could host a model. In at least one embodiment, training can be done offline on a GPU and inference done in real-time on a CPU. In at least one embodiment, if a CPU approach is not a viable option, then a service can run on a GPU instance. In at least one embodiment, because GPUs have different performance and cost characteristics than CPUs, however, running a service that offloads a runtime algorithm to a GPU can require it to be designed differently from a CPU based service.

The server 620 may include the content application 624 that includes the content manager 626 and the stream distribution and routing system 630. As discussed previously, the content manager 626 may send objects, such as datasets and instructions, from the object repository 634 along with requests and other data from the client device 602 to the stream distribution and routing system 630 for stream data processing. The stream distribution and routing system 630 may process input data and provide the results to the transmission manager 622 for sending back to the client device 602. The stream distribution and routing system 630 may also use local datasets or datasets provided by the third party service 660 for stream data processing.

Data Center

Figure 7:
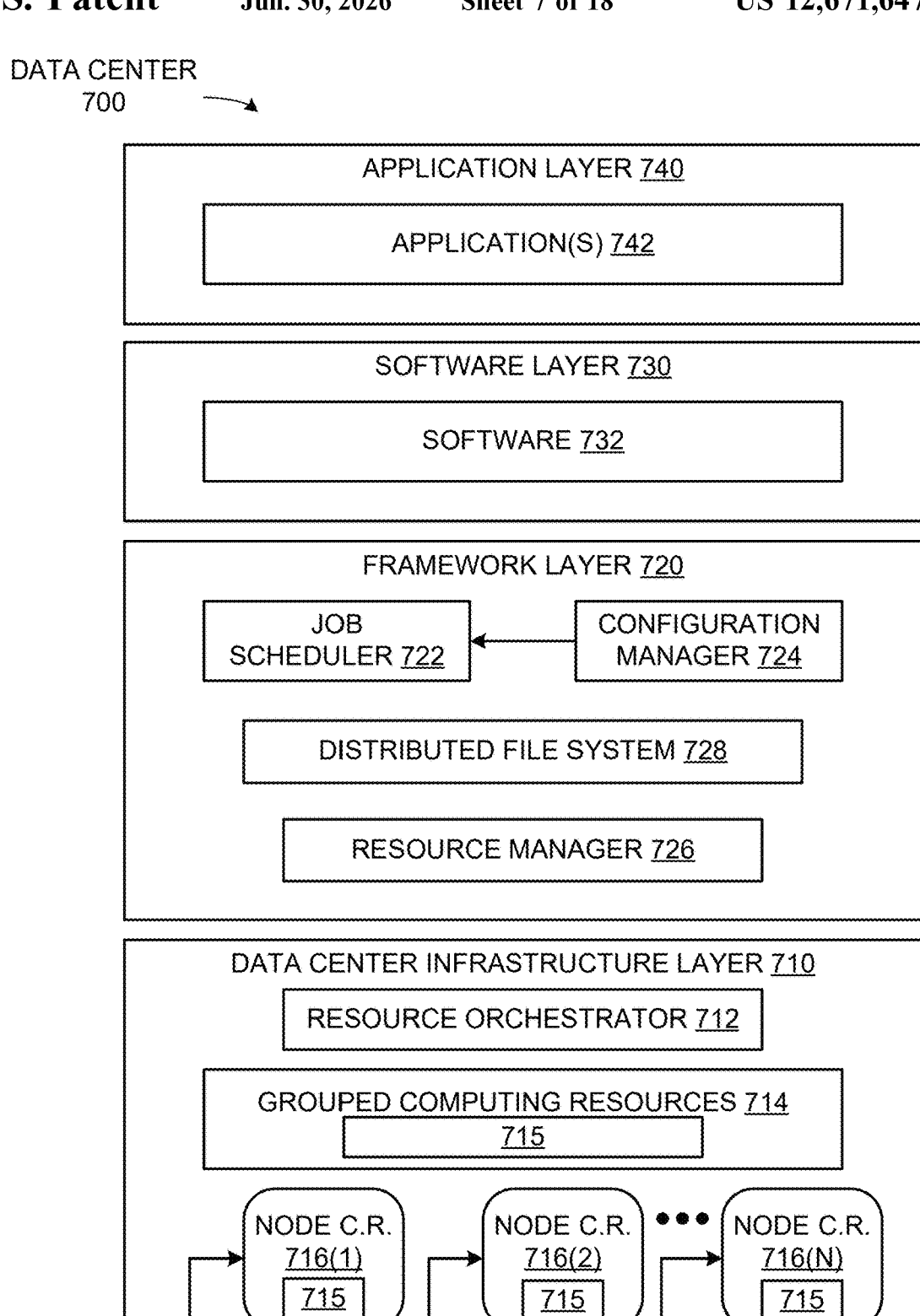
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730 and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents a positive integer (which may be a different integer "N" than used in other figures). In at least one embodiment, node C.R.s 716(1)-716(N) may include, but are not limited to, any number of central processing units ("CPUs") or other processors (including accelerators, field programmable gate arrays (FPGAs), graphics processors, etc.), memory storage devices 718(1)-718(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). In at least one embodiment, separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator 712 may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resources 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. In at least one embodiment, one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. In at least one embodiment, inference and/or training logic 715 may be used in system FIG. 7 for inferencing or predicting operations based, at least in part, on weight parameters calculated using neural network training operations, neural network functions and/or architectures, or neural network use cases described herein.

Embodiments presented herein can allow for a linear regulator with one or more features for improving the PSRR to identify and correct voltage noise within a circuit.

Computer Systems

Figure 8:
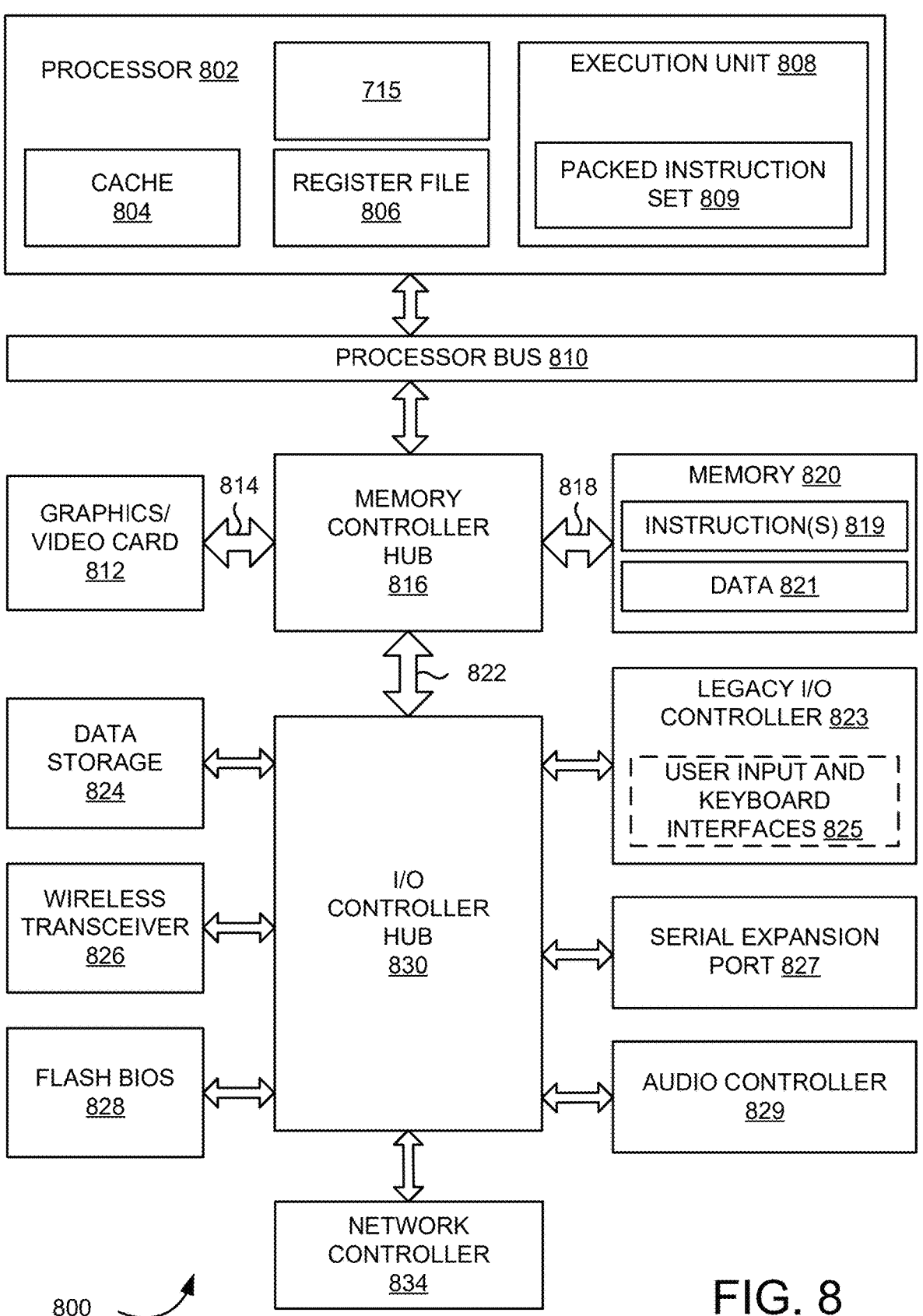
FIG. 8 is a block diagram illustrating a computer system, according to at least one embodiment.

FIG. 8 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™ Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment, computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, a register file 806 may store different types of data in various registers including, without limitation, integer registers, floating point registers, status registers, and an instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor, along with associated circuitry to execute instructions, operations used by many multimedia applications may be performed using packed data in processor 802. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be a Dynamic Random Access Memory ("DRAM") device, a Static Random Access Memory ("SRAM") device, a flash memory device, or another memory device. In at least one embodiment, memory 820 may store instruction(s) 819 and/or data 821 represented by data signals that may be executed by processor 802.

In at least one embodiment, a system logic chip may be coupled to processor bus 810 and memory 820. In at least one embodiment, a system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data, and textures. In at least one embodiment, MCH 816 may direct data signals between processor 802, memory 820, and other components in computer system 800 and to bridge data signals between processor bus 810, memory 820, and a system I/O interface 822. In at least one embodiment, a system logic chip may provide a graphics port for coupling to a graphics controller. In at least one embodiment, MCH 816 may be coupled to memory 820 through high bandwidth memory path 818 and a graphics/video card 812 may be coupled to MCH 816 through an Accelerated Graphics Port ("AGP") interconnect 814.

In at least one embodiment, computer system 800 may use system I/O interface 822 as a proprietary hub interface bus to couple MCH 816 to an I/O controller hub ("ICH") 830. In at least one embodiment, ICH 830 may provide direct connections to some I/O devices via a local I/O bus. In at least one embodiment, a local I/O bus may include, without limitation, a high-speed I/O bus for connecting peripherals to memory 820, a chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as a Universal Serial Bus ("USB") port, and a network controller 834. In at least one embodiment, data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary SoC. In at least one embodiment, devices illustrated in FIG. 8 may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 715 are used to perform inferencing and/or training operations associated with one or more embodiments. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Embodiments presented herein can allow for a linear regulator with one or more features for improving the PSRR to identify and correct voltage noise within a circuit.

Figure 9:
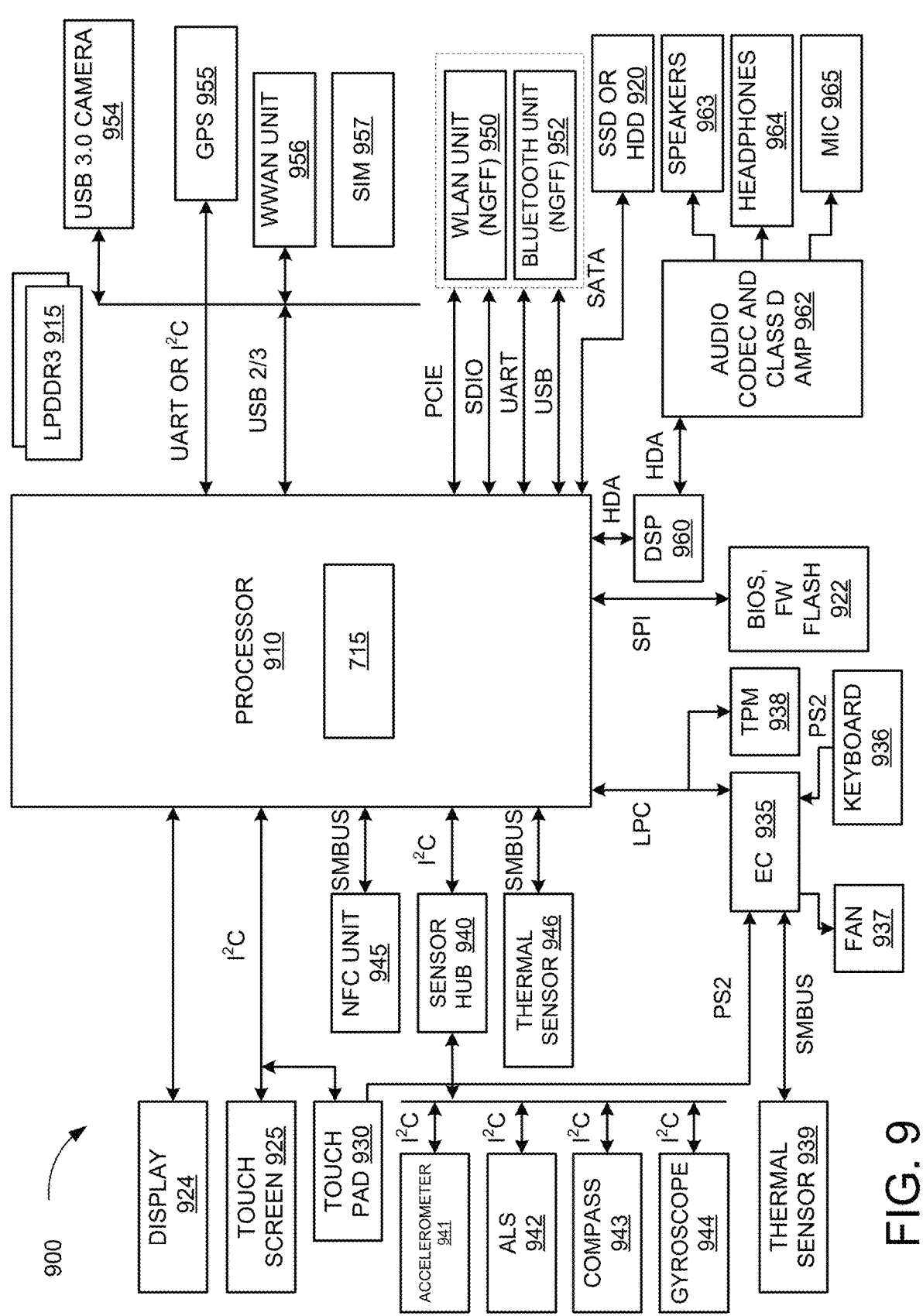
FIG. 9 is a block diagram illustrating a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 900 may include, without limitation, processor 910 communicatively coupled to any suitable number or kind of components, peripherals, modules, or devices. In at least one embodiment, processor 910 is coupled using a bus or interface, such as a I²C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary SoC. In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) unit 955, a camera ("USB 3.0 camera") 954 such as a USB 3.0 camera, and/or a Low Power Double Data Rate ("LPDDR") memory unit ("LPDDR3") 915 implemented in, for example, an LPDDR3 standard. These components may each be implemented in any suitable manner.

In at least one embodiment, other components may be communicatively coupled to processor 910 through components described herein. In at least one embodiment, an accelerometer 941, an ambient light sensor ("ALS") 942, a compass 943, and a gyroscope 944 may be communicatively coupled to sensor hub 940. In at least one embodiment, a thermal sensor 939, a fan 937, a keyboard 936, and touch pad 930 may be communicatively coupled to EC 935. In at least one embodiment, speakers 963, headphones 964, and a microphone ("mic") 965 may be communicatively coupled to an audio unit ("audio codec and class D amp") 962, which may in turn be communicatively coupled to DSP 960. In at least one embodiment, audio unit 962 may include, for example and without limitation, an audio coder/decoder ("codec") and a class D amplifier. In at least one embodiment, a SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Inference and/or training logic 715 are used to perform inferencing and/or training operations associated with one or more embodiments. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Embodiments presented herein can allow for a linear regulator with one or more features for improving the PSRR to identify and correct voltage noise within a circuit.

Figure 10:
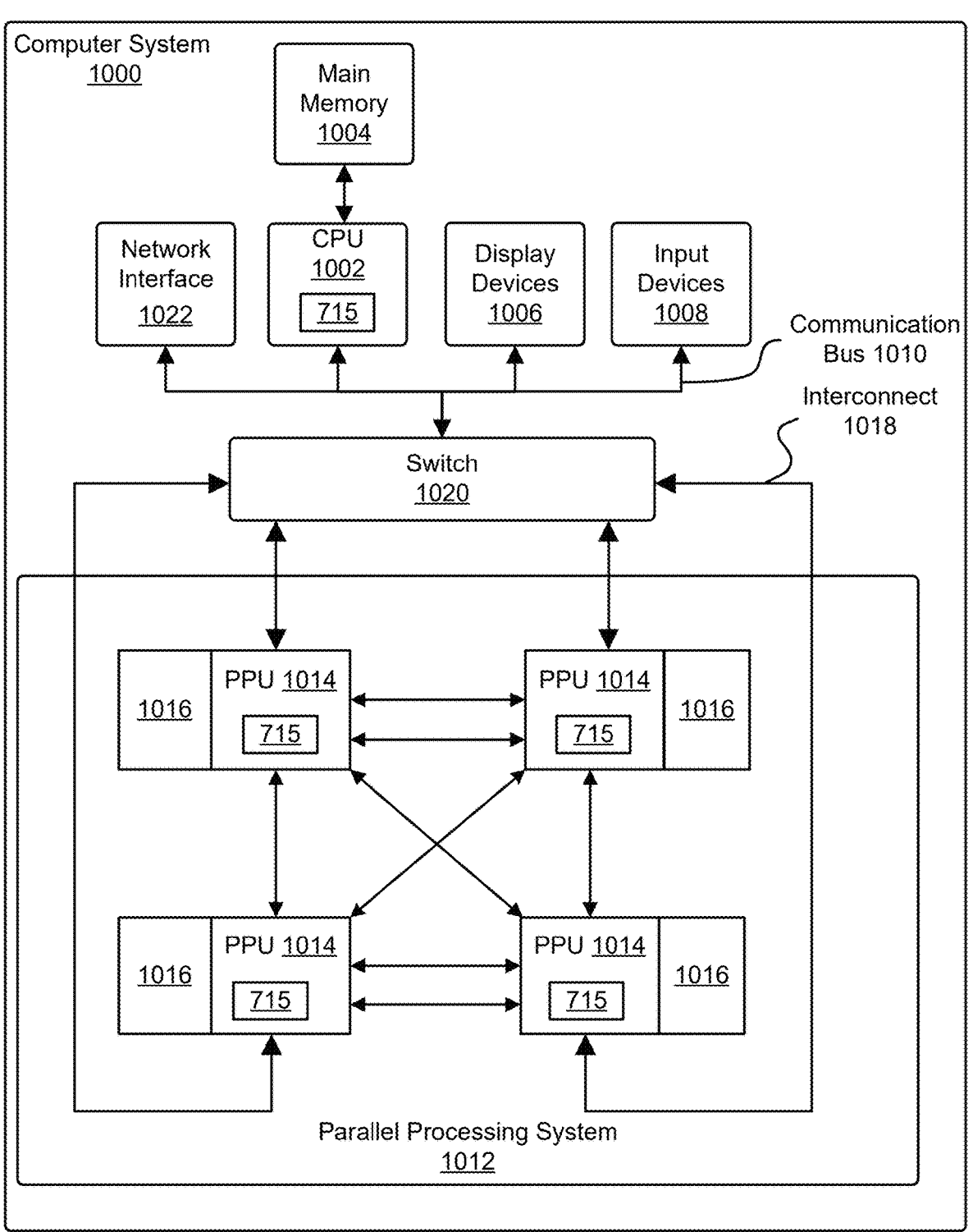
FIG. 10 illustrates a computer system, according to at least one embodiment.

FIG. 10 illustrates a computer system 1000, according to at least one embodiment. In at least one embodiment, computer system 1000 is configured to implement various processes and methods described throughout this disclosure.

In at least one embodiment, computer system 1000 comprises, without limitation, at least one central processing unit ("CPU") 1002 that is connected to a communication bus 1010 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1000 includes, without limitation, a main memory 1004 and control logic (e.g., implemented as hardware, software, or a combination thereof) and data are stored in main memory 1004, which may take form of random access memory ("RAM"). In at least one embodiment, a network interface subsystem ("network interface") 1022 provides an interface to other computing devices and networks for receiving data from and transmitting data to other systems with computer system 1000.

In at least one embodiment, computer system 1000, in at least one embodiment, includes, without limitation, input devices 1008, a parallel processing system 1012, and display devices 1006 that can be implemented using a conventional cathode ray tube ("CRT"), a liquid crystal display ("LCD"), a light emitting diode ("LED") display, a plasma display, or other suitable display technologies. In at least one embodiment, user input is received from input devices 1008 such as keyboard, mouse, touchpad, microphone, etc. In at least one embodiment, each module described herein can be situated on a single semiconductor platform to form a processing system.

Inference and/or training logic 715 are used to perform inferencing and/or training operations associated with one or more embodiments. In at least one embodiment, inference and/or training logic 715 may be used in system FIG. 01 for inferencing or predicting operations based, at least in part, on weight parameters calculated using neural network training operations, neural network functions and/or architectures, or neural network use cases described herein.

Embodiments presented herein can allow for a linear regulator with one or more features for improving the PSRR to identify and correct voltage noise within a circuit.

Figure 11:
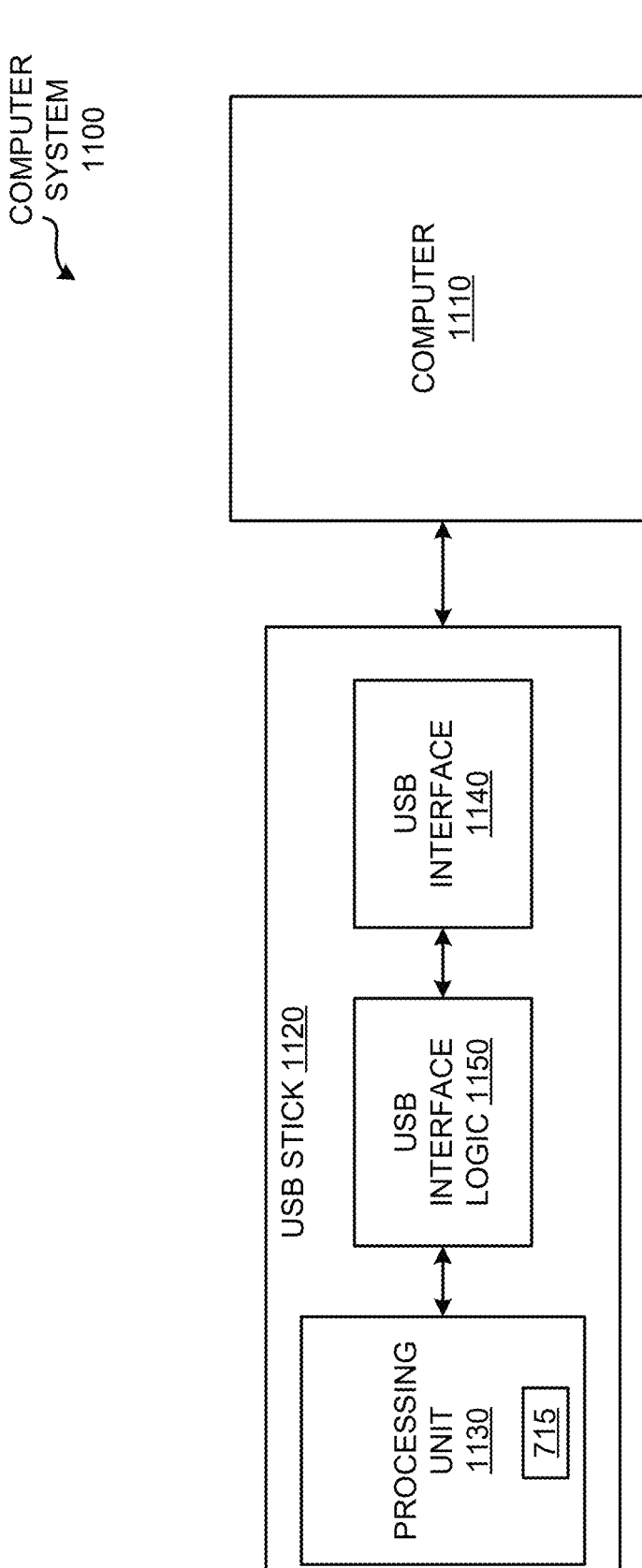
FIG. 11 illustrates a computer system, according to at least one embodiment.

FIG. 11 illustrates a computer system 1100, according to at least one embodiment. In at least one embodiment, computer system 1100 includes, without limitation, a computer 1110 and a USB stick 1120. In at least one embodiment, computer 1110 may include, without limitation, any number and type of processor(s) (not shown) and a memory (not shown). In at least one embodiment, computer 1110 includes, without limitation, a server, a cloud instance, a laptop, and a desktop computer.

In at least one embodiment, USB stick 1120 includes, without limitation, a processing unit 1130, a USB interface 1140, and USB interface logic 1150. In at least one embodiment, processing unit 1130 may be any instruction execution system, apparatus, or device capable of executing instructions. In at least one embodiment, processing unit 1130 may include, without limitation, any number and type of processing cores (not shown). In at least one embodiment, processing unit 1130 comprises an application specific integrated circuit ("ASIC") that is optimized to perform any amount and type of operations associated with machine learning. For instance, in at least one embodiment, processing unit 1130 is a tensor processing unit ("TPC") that is optimized to perform machine learning inference operations. In at least one embodiment, processing unit 1130 is a vision processing unit ("VPU") that is optimized to perform machine vision and machine learning inference operations.

In at least one embodiment, USB interface 1140 may be any type of USB connector or USB socket. For instance, in at least one embodiment, USB interface 1140 is a USB 3.0 Type-C socket for data and power. In at least one embodiment, USB interface 1140 is a USB 3.0 Type-A connector. In at least one embodiment, USB interface logic 1150 may include any amount and type of logic that enables processing unit 1130 to interface with devices (e.g., computer 1110) via USB connector 1140.

Inference and/or training logic 715 are used to perform inferencing and/or training operations associated with one or more embodiments. In at least one embodiment, inference and/or training logic 715 may be used in system FIG. 11 for inferencing or predicting operations based, at least in part, on weight parameters calculated using neural network training operations, neural network functions and/or architectures, or neural network use cases described herein.

Embodiments presented herein can allow for a linear regulator with one or more features for improving the PSRR to identify and correct voltage noise within a circuit.

Figure 12:
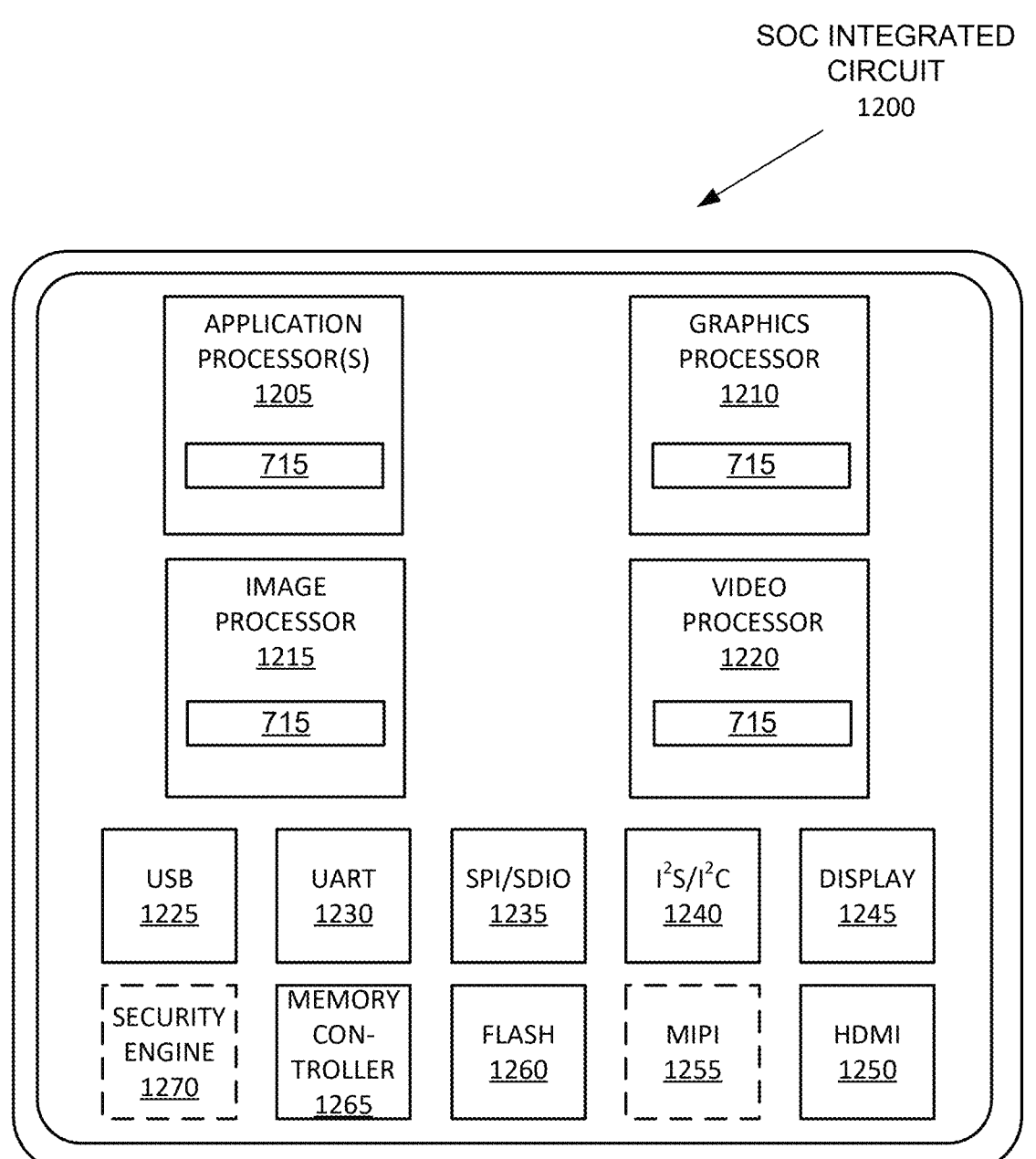
FIG. 12 illustrates exemplary integrated circuits and associated graphics processors, according to at least one embodiment.

FIG. 12 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 12 is a block diagram illustrating an exemplary system-on-a-chip (SOC) integrated circuit 1200 that may be fabricated using one or more IP cores, according to at least one embodiment. In at least one embodiment, SOC integrated circuit 1200 includes one or more application processor(s) 1205 (e.g., CPUs), at least one graphics processor 1210, and may additionally include an image processor 1215 and/or a video processor 1220, any of which may be a modular IP core. In at least one embodiment, SOC integrated circuit 1200 includes peripheral or bus logic including a USB controller 1225, a UART controller 1230, an SPI/SDIO controller 1235, and an I²S/I²C controller 1240. In at least one embodiment, SOC integrated circuit 1200 can include a display device 1245 coupled to one or more of a high-definition multimedia interface (HDMI) controller 1250 and a mobile industry processor interface (MIPI) display interface 1255. In at least one embodiment, storage may be provided by a flash memory subsystem 1260 including flash memory and a flash memory controller. In at least one embodiment, a memory interface may be provided via a memory controller 1265 for access to SDRAM or SRAM memory devices. In at least one embodiment, some integrated circuits additionally include an embedded security engine 1270.

Inference and/or training logic 715 are used to perform inferencing and/or training operations associated with one or more embodiments. In at least one embodiment, inference and/or training logic 715 may be used in SOC integrated circuit 1200 for inferencing or predicting operations based, at least in part, on weight parameters calculated using neural network training operations, neural network functions and/or architectures, or neural network use cases described herein.

Embodiments presented herein can allow for a linear regulator with one or more features for improving the PSRR to identify and correct voltage noise within a circuit.

Figure 13A:
FIGS. 13A, 13B illustrate exemplary integrated circuits and associated graphics processors, according to at least one embodiment.
Figure 13B:
Figure 13B:
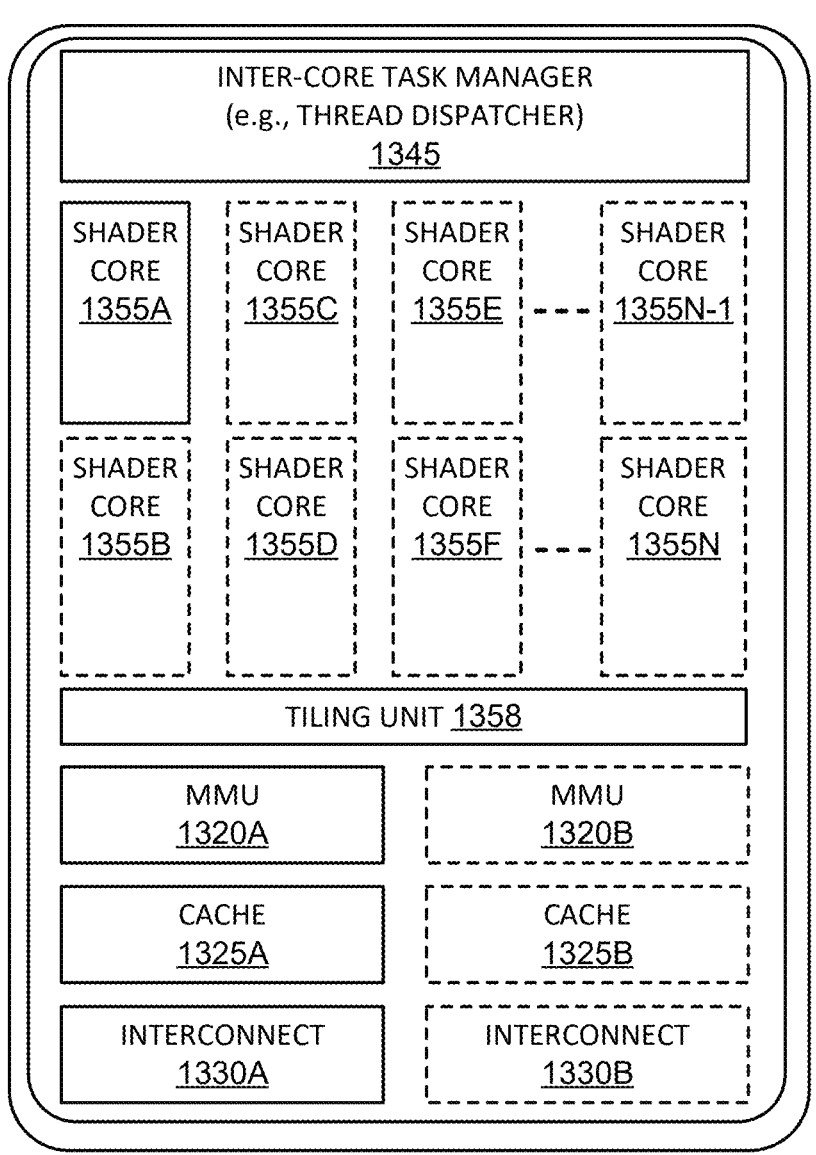

FIGS. 13A-13B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to at least one embodiment. FIG. 13B illustrates an additional exemplary graphics processor 1340 of a system on a chip integrated circuit that may be fabricated using one or more IP cores, according to at least one embodiment. In at least one embodiment, graphics processor 1310 of FIG. 13A is a low power graphics processor core. In at least one embodiment, graphics processor 1340 of FIG. 13B is a higher performance graphics processor core. In at least one embodiment, each of graphics processors 1310, 1340 can be variants of computer system 1100 of FIG. 11.

In at least one embodiment, graphics processor 1310 includes a vertex processor 1305 and one or more fragment processor(s) 1315A-1315N (e.g., 1315A, 1315B, 1315C, 1315D, through 1315N-1, and 1315N). In at least one embodiment, graphics processor 1310 can execute different shader programs via separate logic, such that vertex processor 1305 is optimized to execute operations for vertex shader programs, while one or more fragment processor(s) 1315A-1315N execute fragment (e.g., pixel) shading operations for fragment or pixel shader programs. In at least one embodiment, vertex processor 1305 performs a vertex processing stage of a 3D graphics pipeline and generates primitives and vertex data. In at least one embodiment, fragment processor(s) 1315A-1315N use primitive and vertex data generated by vertex processor 1305 to produce a framebuffer that is displayed on a display device. In at least one embodiment, fragment processor(s) 1315A-1315N are optimized to execute fragment shader programs as provided for in an OpenGL API, which may be used to perform similar operations as a pixel shader program as provided for in a Direct 3D API.

In at least one embodiment, graphics processor 1310 additionally includes one or more memory management units (MMUs) 1320A-1320B, cache(s) 1325A-1325B, and circuit interconnect(s) 1330A-1330B. In at least one embodiment, one or more MMU(s) 1320A-1320B provide for virtual to physical address mapping for graphics processor 1310, including for vertex processor 1305 and/or fragment processor(s) 1315A-1315N, which may reference vertex or image/texture data stored in memory, in addition to vertex or image/texture data stored in one or more cache(s) 1325A-1325B. In at least one embodiment, one or more MMU(s) 1320A-1320B may be synchronized with other MMUs within a system, including one or more MMUs associated with one or more application processor(s) 1305, image processors 1315, and/or video processors 1320 of FIG. 13A, such that each processor 1305-1320 can participate in a shared or unified virtual memory system. In at least one embodiment, one or more circuit interconnect(s) 1330A-1330B enable graphics processor 1310 to interface with other IP cores within SoC, either via an internal bus of SoC or via a direct connection.

In at least one embodiment, graphics processor 1340 includes one or more shader core(s) 1355A-1355N (e.g., 1355A, 1355B, 1355C, 1355D, 1355E, 1355F, through 1355N-1, and 1355N) as shown in FIG. 13B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Embodiments presented herein can allow for a linear regulator with one or more features for improving the PSRR to identify and correct voltage noise within a circuit.

Figure 14:
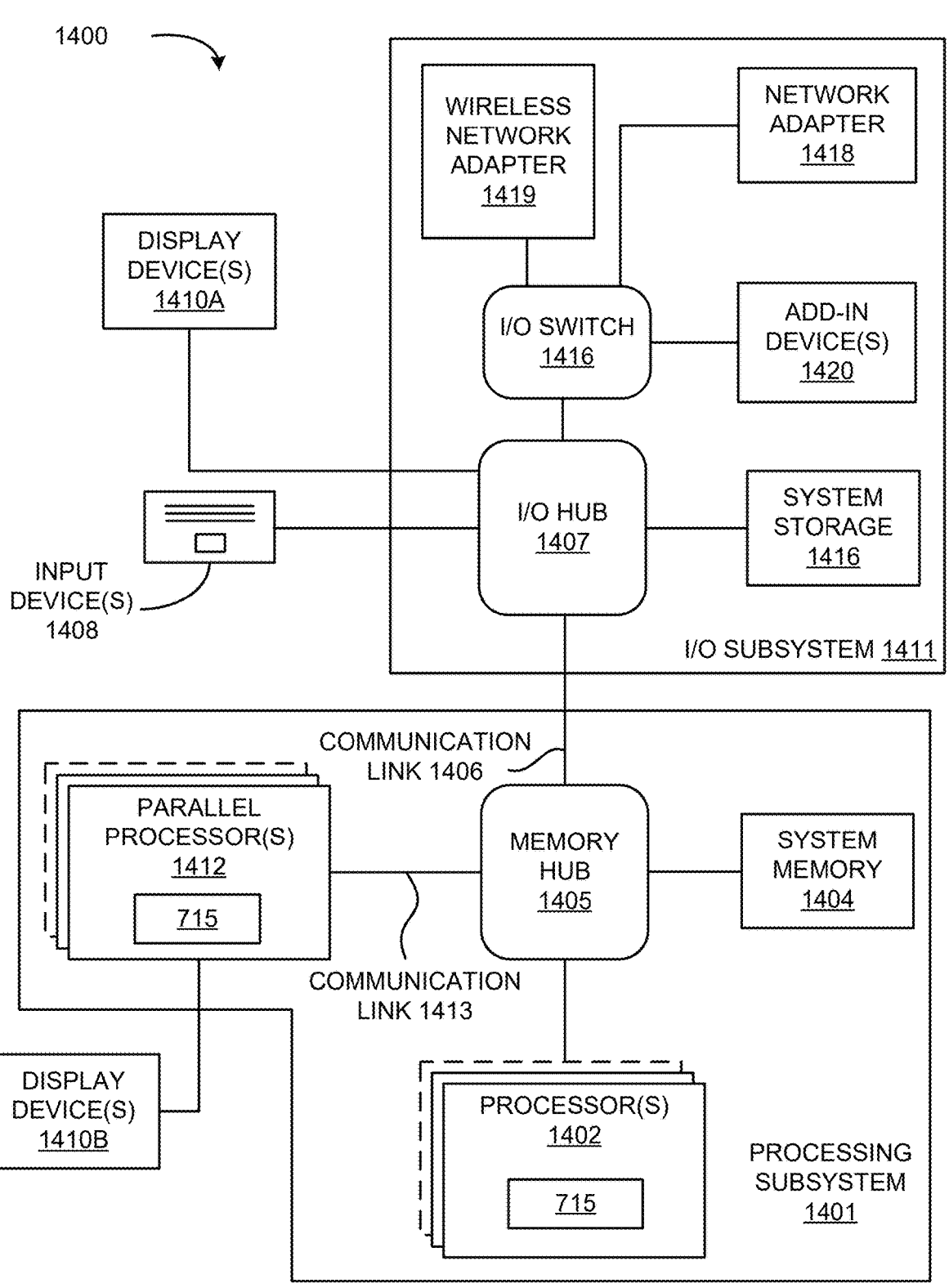
FIG. 14 illustrates a computer system, according to at least one embodiment.

FIG. 14 is a block diagram illustrating a computing system 1400 according to at least one embodiment. In at least one embodiment, computing system 1400 includes a processing subsystem 1401 having one or more processor(s) 1402 and a system memory 1404 communicating via an interconnection path that may include a memory hub 1405. In at least one embodiment, memory hub 1405 may be a separate component within a chipset component or may be integrated within one or more processor(s) 1402. In at least one embodiment, memory hub 1405 couples with an I/O subsystem 1411 via a communication link 1406. In at least one embodiment, I/O subsystem 1411 includes an I/O hub 1407 that can enable computing system 1400 to receive input from one or more input device(s) 1408. In at least one embodiment, I/O hub 1407 can enable a display controller, which may be included in one or more processor(s) 1402, to provide outputs to one or more display device(s) 1410A. In at least one embodiment, one or more display device(s) 1410A coupled with I/O hub 1407 can include a local, internal, or embedded display device.

In at least one embodiment, processing subsystem 1401 includes one or more parallel processor(s) 1412 coupled to memory hub 1405 via a bus or other communication link 1413. In at least one embodiment, communication link 1413 may use one of any number of standards based communication link technologies or protocols, such as but not limited to PCI Express, or may be a vendor-specific communications interface or communications fabric. In at least one embodiment, one or more parallel processor(s) 1412 form a computationally focused parallel or vector processing system that can include a large number of processing cores and/or processing clusters, such as a many-integrated core (MIC) processor. In at least one embodiment, some or all of parallel processor(s) 1412 form a graphics processing subsystem that can output pixels to one of one or more display device(s) 1410A coupled via I/O hub 1407. In at least one embodiment, parallel processor(s) 1412 can also include a display controller and display interface (not shown) to enable a direct connection to one or more display device(s) 1410B. In at least one embodiment, parallel processor(s) 1412 include one or more cores, such as graphics cores 1400 discussed herein.

In at least one embodiment, a system storage unit 1414 can connect to I/O hub 1407 to provide a storage mechanism for computing system 1400. In at least one embodiment, an I/O switch 1416 can be used to provide an interface mechanism to enable connections between I/O hub 1407 and other components, such as a network adapter 1418 and/or a wireless network adapter 1419 that may be integrated into platform, and various other devices that can be added via one or more add-in device(s) 1420. In at least one embodiment, network adapter 1418 can be an Ethernet adapter or another wired network adapter. In at least one embodiment, wireless network adapter 1419 can include one or more of a Wi-Fi, Bluetooth, near field communication (NFC), or other network device that includes one or more wireless radios.

In at least one embodiment, computing system 1400 can include other components not explicitly shown, including USB or other port connections, optical storage drives, video capture devices, and like, may also be connected to I/O hub 1407. In at least one embodiment, communication paths interconnecting various components in FIG. 14 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 1412 incorporate circuitry optimized for graphics and video processing, including, for example, video output circuitry, and constitutes a graphics processing unit (GPU), e.g., parallel processor(s) 1412 includes graphics core 1400. In at least one embodiment, parallel processor(s) 1412 incorporate circuitry optimized for general purpose processing. In at least embodiment, components of computing system 1400 may be integrated with one or more other system elements on a single integrated circuit. For example, in at least one embodiment, parallel processor(s) 1412, memory hub 1405, processor(s) 1402, and I/O hub 1407 can be integrated into a system on chip (SoC) integrated circuit. In at least one embodiment, components of computing system 1400 can be integrated into a single package to form a system in package (SIP) configuration. In at least one embodiment, at least a portion of components of computing system 1400 can be integrated into a multi-chip module (MCM), which can be interconnected with other multi-chip modules into a modular computing system.

Inference and/or training logic 715 are used to perform inferencing and/or training operations associated with one or more embodiments. In at least one embodiment, inference and/or training logic 715 may be used in system FIG. 14 for inferencing or predicting operations based, at least in part, on weight parameters calculated using neural network training operations, neural network functions and/or architectures, or neural network use cases described herein.

Embodiments presented herein can allow for a linear regulator with one or more features for improving the PSRR to identify and correct voltage noise within a circuit.

Processors

Figure 15A:
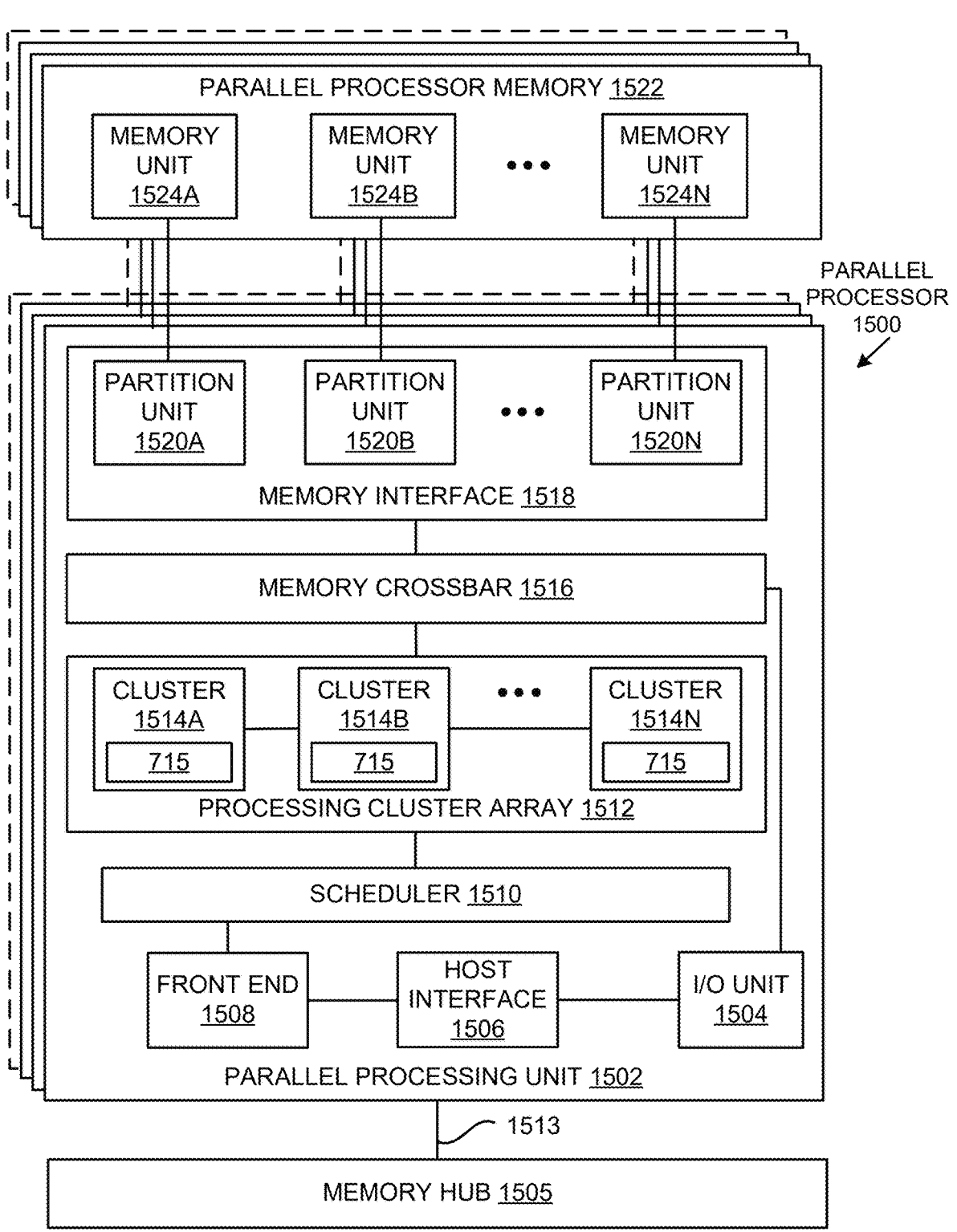
FIG. 15A illustrates a parallel processor, according to at least one embodiment.

FIG. 15A illustrates a parallel processor 1500 according to at least one embodiment. In at least one embodiment, various components of parallel processor 1500 may be implemented using one or more integrated circuit devices, such as programmable processors, application specific integrated circuits (ASICs), or field programmable gate arrays (FPGA). In at least one embodiment, illustrated parallel processor 1500 is a variant of one or more parallel processor(s) 1412 shown in FIG. 14 according to an exemplary embodiment. In at least one embodiment, a parallel processor 1500 includes one or more graphics cores 1400.

In at least one embodiment, parallel processor 1500 includes a parallel processing unit 1502. In at least one embodiment, parallel processing unit 1502 includes an I/O unit 1504 that enables communication with other devices, including other instances of parallel processing unit 1502. In at least one embodiment, I/O unit 1504 may be directly connected to other devices. In at least one embodiment, I/O unit 1504 connects with other devices via use of a hub or switch interface, such as a memory hub 1505. In at least one embodiment, connections between memory hub 1505 and I/O unit 1504 form a communication link 1513. In at least one embodiment, I/O unit 1504 connects with a host interface 1506 and a memory crossbar 1516, where host interface 1506 receives commands directed to performing processing operations and memory crossbar 1516 receives commands directed to performing memory operations.

In at least one embodiment, when host interface 1506 receives a command buffer via I/O unit 1504, host interface 1506 can direct work operations to perform those commands to a front end 1508. In at least one embodiment, front end 1508 couples with a scheduler 1510 (which may be referred to as a sequencer), which is configured to distribute commands or other work items to a processing cluster array 1512. In at least one embodiment, scheduler 1510 ensures that processing cluster array 1512 is properly configured and in a valid state before tasks are distributed to a cluster of processing cluster array 1512. In at least one embodiment, scheduler 1510 is implemented via firmware logic executing on a microcontroller. In at least one embodiment, microcontroller implemented scheduler 1510 is configurable to perform complex scheduling and work distribution operations at coarse and fine granularity, enabling rapid preemption and context switching of threads executing on processing array 1512. In at least one embodiment, host software can prove workloads for scheduling on processing cluster array 1512 via one of multiple graphics processing paths. In at least one embodiment, workloads can then be automatically distributed across processing array cluster 1512 by scheduler 1510 logic within a microcontroller including scheduler 1510.

In at least one embodiment, processing cluster array 1512 can include up to "N" processing clusters (e.g., cluster 1514A, cluster 1514B, through cluster 1514N), where "N" represents a positive integer (which may be a different integer "N" than used in other figures). In at least one embodiment, each cluster 1514A-1514N of processing cluster array 1512 can execute a large number of concurrent threads. In at least one embodiment, scheduler 1510 can allocate work to clusters 1514A-1514N of processing cluster array 1512 using various scheduling and/or work distribution algorithms, which may vary depending on workload arising for each type of program or computation. In at least one embodiment, scheduling can be handled dynamically by scheduler 1510, or can be assisted in part by compiler logic during compilation of program logic configured for execution by processing cluster array 1512. In at least one embodiment, different clusters 1514A-1514N of processing cluster array 1512 can be allocated for processing different types of programs or for performing different types of computations.

In at least one embodiment, processing cluster array 1512 can be configured to perform various types of parallel processing operations. In at least one embodiment, processing cluster array 1512 is configured to perform general-purpose parallel compute operations. For example, in at least one embodiment, processing cluster array 1512 can include logic to execute processing tasks including filtering of video and/or audio data, performing modeling operations, including physics operations, and performing data transformations.

In at least one embodiment, processing cluster array 1512 is configured to perform parallel graphics processing operations. In at least one embodiment, processing cluster array 1512 can include additional logic to support execution of such graphics processing operations, including but not limited to, texture sampling logic to perform texture operations, as well as tessellation logic and other vertex processing logic. In at least one embodiment, processing cluster array 1512 can be configured to execute graphics processing related shader programs such as but not limited to, vertex shaders, tessellation shaders, geometry shaders, and pixel shaders. In at least one embodiment, parallel processing unit 1502 can transfer data from system memory via I/O unit 1504 for processing. In at least one embodiment, during processing, transferred data can be stored to on-chip memory (e.g., parallel processor memory 1522) during processing, then written back to system memory.

In at least one embodiment, when parallel processing unit 1502 is used to perform graphics processing, scheduler 1510 can be configured to divide a processing workload into approximately equal sized tasks, to better enable distribution of graphics processing operations to multiple clusters 1514A-1514N of processing cluster array 1512. In at least one embodiment, portions of processing cluster array 1512 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1514A-1514N may be stored in buffers to allow intermediate data to be transmitted between clusters 1514A-1514N for further processing.

In at least one embodiment, processing cluster array 1512 can receive processing tasks to be executed via scheduler 1510, which receives commands defining processing tasks from front end 1508. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 1510 may be configured to fetch indices corresponding to tasks or may receive indices from front end 1508. In at least one embodiment, front end 1508 can be configured to ensure processing cluster array 1512 is configured to a valid state before a workload specified by incoming command buffers (e.g., batch-buffers, push buffers, etc.) is initiated.

In at least one embodiment, each of one or more instances of parallel processing unit 1502 can couple with a parallel processor memory 1522. In at least one embodiment, parallel processor memory 1522 can be accessed via memory crossbar 1516, which can receive memory requests from processing cluster array 1512 as well as I/O unit 1504. In at least one embodiment, memory crossbar 1516 can access parallel processor memory 1522 via a memory interface 1518. In at least one embodiment, memory interface 1618 can include multiple partition units (e.g., partition unit 1520A, partition unit 1520B, through partition unit 1520N) that can each couple to a portion (e.g., memory unit) of parallel processor memory 1522. In at least one embodiment, a number of partition units 1520A-1520N is configured to be equal to a number of memory units, such that a first partition unit 1520A has a corresponding first memory unit 1524A, a second partition unit 1520B has a corresponding memory unit 1524B, and an N-th partition unit 1520N has a corresponding N-th memory unit 1524N. In at least one embodiment, a number of partition units 1520A-1520N may not be equal to a number of memory units.

In at least one embodiment, memory units 1524A-1524N can include various types of memory devices, including dynamic random access memory (DRAM) or graphics random access memory, such as synchronous graphics random access memory (SGRAM), including graphics double data rate (GDDR) memory. In at least one embodiment, memory units 1524A-1524N may also include 3D stacked memory, including but not limited to high bandwidth memory (HBM), HBM2e, or HDM3. In at least one embodiment, render targets, such as frame buffers or texture maps may be stored across memory units 1524A-1524N, allowing partition units 1520A-1520N to write portions of each render target in parallel to efficiently use available bandwidth of parallel processor memory 1522. In at least one embodiment, a local instance of parallel processor memory 1522 may be excluded in favor of a unified memory design that utilizes system memory in conjunction with local cache memory.

In at least one embodiment, any one of clusters 1514A-1514N of processing cluster array 1512 can process data that will be written to any of memory units 1524A-1524N within parallel processor memory 1522. In at least one embodiment, memory crossbar 1516 can be configured to transfer an output of each cluster 1614A-1614N to any partition unit 1520A-1520N or to another cluster 1514A-1514N, which can perform additional processing operations on an output. In at least one embodiment, each cluster 1514A-1514N can communicate with memory interface 1518 through memory crossbar 1516 to read from or write to various external memory devices. In at least one embodiment, memory crossbar 1516 has a connection to memory interface 1518 to communicate with I/O unit 1504, as well as a connection to a local instance of parallel processor memory 1522, enabling processing units within different processing clusters 1514A-1514N to communicate with system memory or other memory that is not local to parallel processing unit 1502. In at least one embodiment, memory crossbar 1516 can use virtual channels to separate traffic streams between clusters 1514A-1514N and partition units 1520A-1520N.

In at least one embodiment, multiple instances of parallel processing unit 1502 can be provided on a single add-in card, or multiple add-in cards can be interconnected. In at least one embodiment, different instances of parallel processing unit 1502 can be configured to interoperate even if different instances have different numbers of processing cores, different amounts of local parallel processor memory, and/or other configuration differences. For example, in at least one embodiment, some instances of parallel processing unit 1502 can include higher precision floating point units relative to other instances. In at least one embodiment, systems incorporating one or more instances of parallel processing unit 1502 or parallel processor 1500 can be implemented in a variety of configurations and form factors, including but not limited to desktop, laptop, or handheld personal computers, servers, workstations, game consoles, and/or embedded systems.

Figure 15B:
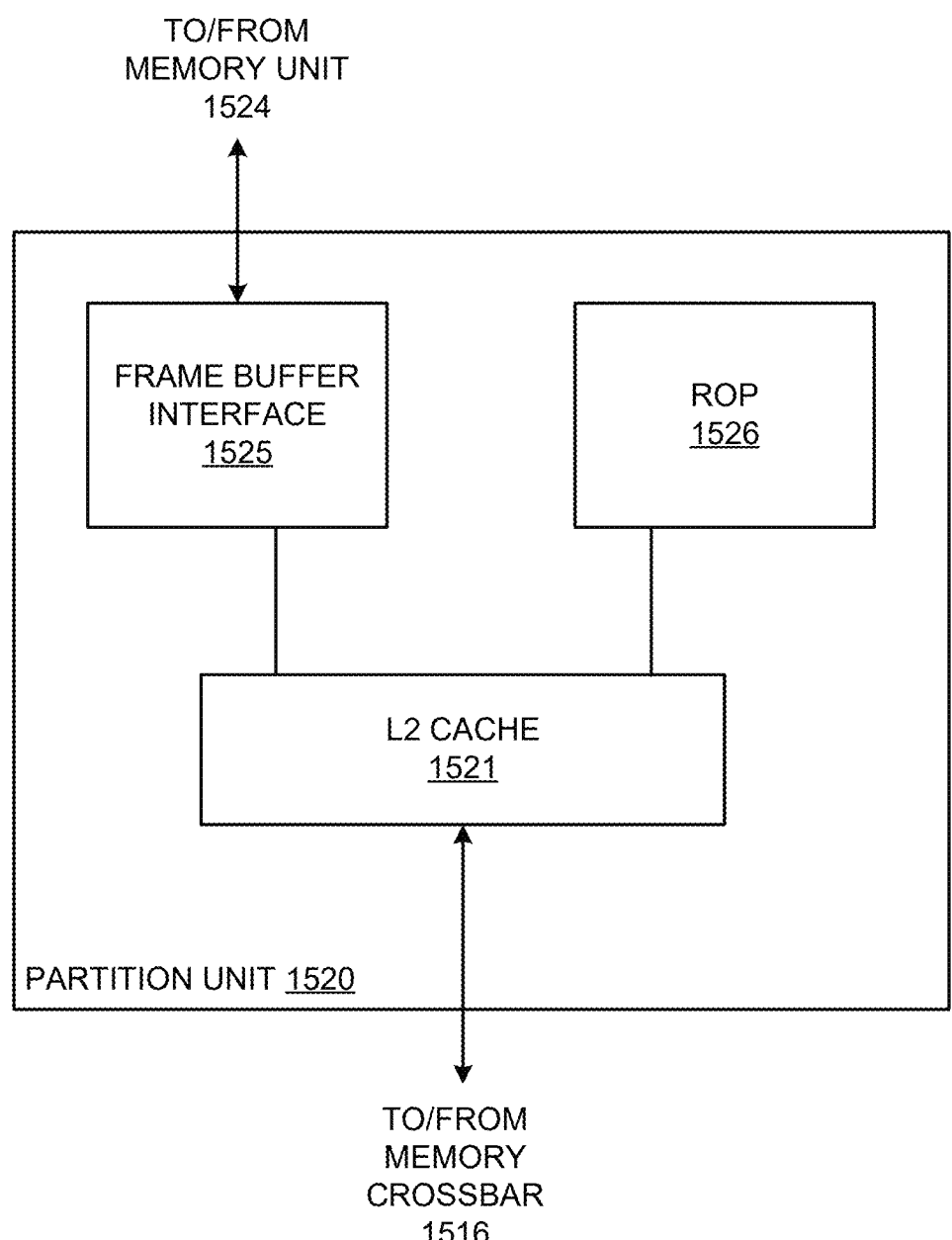
FIG. 15B illustrates a partition unit, according to at least one embodiment.

FIG. 15B is a block diagram of a partition unit 1520 according to at least one embodiment. In at least one embodiment, partition unit 1520 is an instance of one of partition units 1520A-1520N of FIG. 15A. In at least one embodiment, partition unit 1520 includes an L2 cache 1521, a frame buffer interface 1525, and a ROP 1526 (raster operations unit). In at least one embodiment, L2 cache 1621 is a read/write cache that is configured to perform load and store operations received from memory crossbar 1516 and ROP 1526. In at least one embodiment, read misses and urgent write-back requests are output by L2 cache 1521 to frame buffer interface 1525 for processing. In at least one embodiment, updates can also be sent to a frame buffer via frame buffer interface 1525 for processing. In at least one embodiment, frame buffer interface 1525 interfaces with one of memory units in parallel processor memory, such as memory units 1524A-1524N of FIG. 15A (e.g., within parallel processor memory 1522).

In at least one embodiment, ROP 1526 is a processing unit that performs raster operations such as stencil, z test, blending, etc. In at least one embodiment, ROP 1526 then outputs processed graphics data that is stored in graphics memory. In at least one embodiment, ROP 1526 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 1526 can vary based on statistical characteristics of data to be compressed. For example, in at least one embodiment, delta color compression is performed on depth and color data on a per-tile basis.

In at least one embodiment, ROP 1526 is included within each processing cluster (e.g., cluster 1514A-1514N of FIG. 15A) instead of within partition unit 1520. In at least one embodiment, read and write requests for pixel data are transmitted over memory crossbar 1516 instead of pixel fragment data. In at least one embodiment, processed graphics data may be displayed on a display device, such as one of one or more display device(s) 1410 of FIG. 14, routed for further processing by processor(s) 1402, or routed for further processing by one of processing entities within parallel processor 1500 of FIG. 15A.

Embodiments presented herein can allow for a linear regulator with one or more features for improving the PSRR to identify and correct voltage noise within a circuit.

Figure 16:
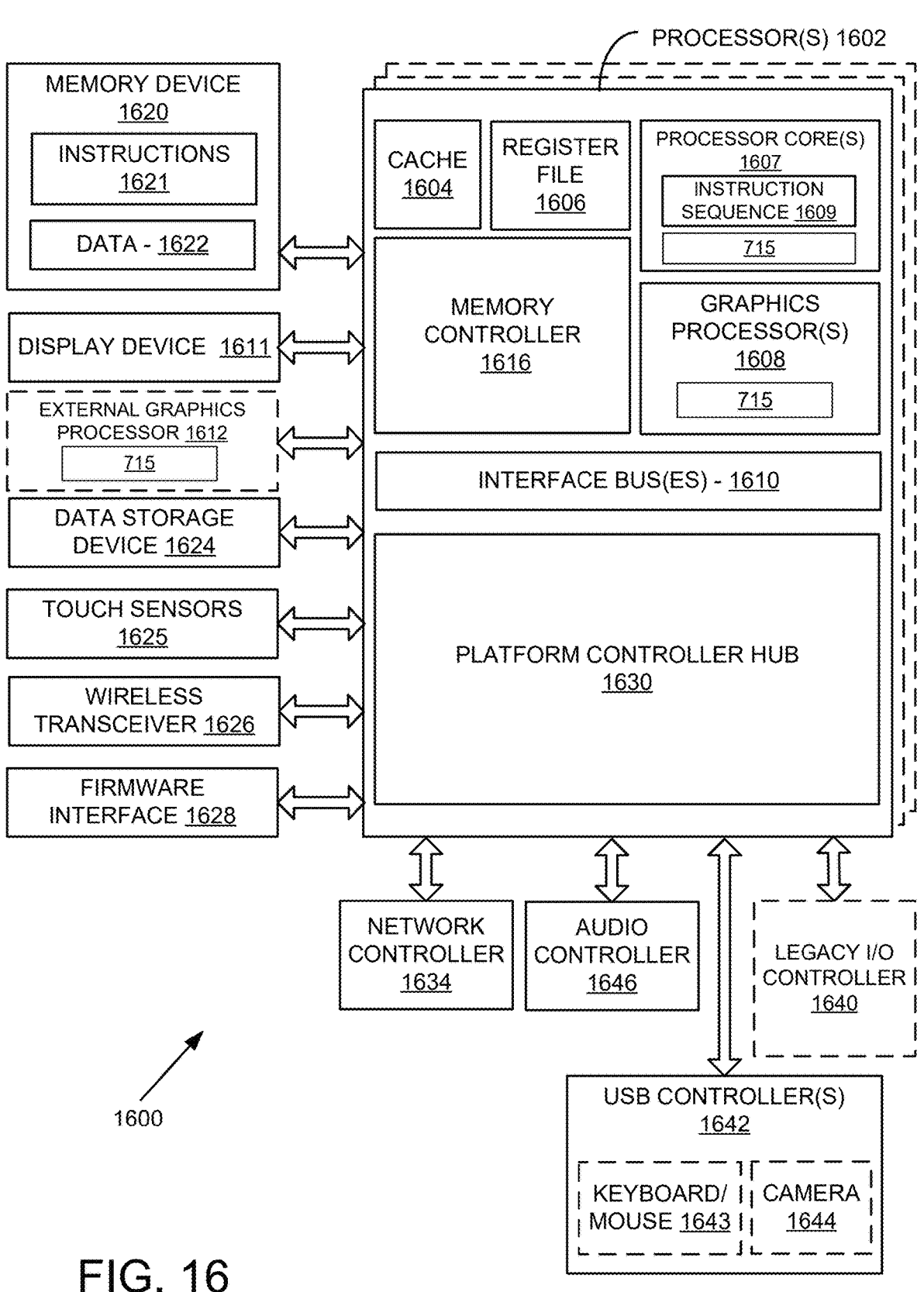
FIG. 16 illustrates at least portions of a graphics processor, according to one or more embodiments.

FIG. 16 is a block diagram of a processing system, according to at least one embodiment. In at least one embodiment, system 1600 includes one or more processor(s) 1602 and one or more graphics processor(s) 1608, and may be a single processor desktop system, a multiprocessor workstation system, or a server system having a large number of processor(s) 1602 or processor core(s) 1607. In at least one embodiment, system 1600 is a processing platform incorporated within a system-on-a-chip (SoC) integrated circuit for use in mobile, handheld, or embedded devices. In at least one embodiment, one or more graphics processor(s) 1608 include one or more graphics cores 1400.

In at least one embodiment, system 1600 can include, or be incorporated within a server-based gaming platform, a game console, including a game and media console, a mobile gaming console, a handheld game console, or an online game console. In at least one embodiment, system 1600 is a mobile phone, a smart phone, a tablet computing device or a mobile Internet device. In at least one embodiment, processing system 1600 can also include, couple with, or be integrated within a wearable device, such as a smart watch wearable device, a smart eyewear device, an augmented reality device, or a virtual reality device. In at least one embodiment, processing system 1600 is a television or set top box device having one or more processor(s) 1602 and a graphical interface generated by one or more graphics processor(s) 1608.

In at least one embodiment, one or more processor(s) 1602 each include one or more processor core(s) 1607 to process instructions which, when executed, perform operations for system and user software. In at least one embodiment, each of one or more processor core(s) 1607 is configured to process a specific instruction sequence 1609. In at least one embodiment, instruction sequence 1609 may facilitate Complex Instruction Set Computing (CISC), Reduced Instruction Set Computing (RISC), or computing via a Very Long Instruction Word (VLIW). In at least one embodiment, processor core(s) 1607 may each process a different instruction sequence 1609, which may include instructions to facilitate emulation of other instruction sequences. In at least one embodiment, processor core(s) 1607 may also include other processing devices, such a Digital Signal Processor (DSP).

In at least one embodiment, processor(s) 1602 includes a cache memory 1604. In at least one embodiment, processor(s) 1602 can have a single internal cache or multiple levels of internal cache. In at least one embodiment, cache memory is shared among various components of processor(s) 1602. In at least one embodiment, processor(s) 1602 also uses an external cache (e.g., a Level-3 (L3) cache or Last Level Cache (LLC)) (not shown), which may be shared among processor core(s) 1607 using known cache coherency techniques. In at least one embodiment, a register file 1606 is additionally included in processor(s) 1602, which may include different types of registers for storing different types of data (e.g., integer registers, floating point registers, status registers, and an instruction pointer register). In at least one embodiment, register file 1606 may include general-purpose registers or other registers.

In at least one embodiment, one or more processor(s) 1602 are coupled with one or more interface bus(es) 1610 to transmit communication signals such as address, data, or control signals between processor(s) 1602 and other components in system 1600. In at least one embodiment, interface bus(es) 1610 can be a processor bus, such as a version of a Direct Media Interface (DMI) bus. In at least one embodiment, interface bus(es) 1610 is not limited to a DMI bus, and may include one or more Peripheral Component Interconnect buses (e.g., PCI, PCI Express), memory busses, or other types of interface busses. In at least one embodiment processor(s) 1602 include an integrated memory controller 1616 and a platform controller hub 1630. In at least one embodiment, memory controller 1616 facilitates communication between a memory device and other components of system 1600, while platform controller hub (PCH) 1630 provides connections to I/O devices via a local I/O bus.

In at least one embodiment, a memory device 1620 can be a dynamic random access memory (DRAM) device, a static random access memory (SRAM) device, flash memory device, phase-change memory device, or some other memory device having suitable performance to serve as process memory. In at least one embodiment, memory device 1620 can operate as system memory for system 1600, to store data 1622 and instructions 1621 for use when one or more processor(s) 1602 executes an application or process. In at least one embodiment, memory controller 1616 also couples with an optional external graphics processor 1612, which may communicate with one or more graphics processor(s) 1608 in processor(s) 1602 to perform graphics and media operations. In at least one embodiment, a display device 1611 can connect to processor(s) 1602. In at least one embodiment, display device 1611 can include one or more of an internal display device, as in a mobile electronic device or a laptop device, or an external display device attached via a display interface (e.g., DisplayPort, etc.). In at least one embodiment, display device 1611 can include a head mounted display (HMD) such as a stereoscopic display device for use in virtual reality (VR) applications or augmented reality (AR) applications.

In at least one embodiment, platform controller hub 1630 enables peripherals to connect to memory device 1620 and processor(s) 1602 via a high-speed I/O bus. In at least one embodiment, I/O peripherals include, but are not limited to, an audio controller 1646, a network controller 1634, a firmware interface 1628, a wireless transceiver 1626, touch sensors 1625, a data storage device 1624 (e.g., hard disk drive, flash memory, etc.). In at least one embodiment, data storage device 1624 can connect via a storage interface (e.g., SATA) or via a peripheral bus, such as a Peripheral Component Interconnect bus (e.g., PCI, PCI Express). In at least one embodiment, touch sensors 1625 can include touch screen sensors, pressure sensors, or fingerprint sensors. In at least one embodiment, wireless transceiver 1626 can be a Wi-Fi transceiver, a Bluetooth transceiver, or a mobile network transceiver such as a 3G, 4G, or Long Term Evolution (LTE) transceiver. In at least one embodiment, firmware interface 1628 enables communication with system firmware, and can be, for example, a unified extensible firmware interface (UEFI). In at least one embodiment, network controller 1634 can enable a network connection to a wired network. In at least one embodiment, a high-performance network controller (not shown) couples with interface bus(es) 1610. In at least one embodiment, audio controller 1646 is a multi-channel high definition audio controller. In at least one embodiment, system 1600 includes an optional legacy I/O controller 1640 for coupling legacy (e.g., Personal System 2 (PS/2)) devices to system 1600. In at least one embodiment, platform controller hub 1630 can also connect to one or more Universal Serial Bus (USB) controller(s) 1642 connect input devices, such as keyboard and mouse 1643 combinations, a camera 1644, or other USB input devices.

In at least one embodiment, an instance of memory controller 1616 and platform controller hub 1630 may be integrated into a discreet external graphics processor, such as external graphics processor 1612. In at least one embodiment, platform controller hub 1630 and/or memory controller 1616 may be external to one or more processor(s) 1602. For example, in at least one embodiment, system 1600 can include an external memory controller 1616 and platform controller hub 1630, which may be configured as a memory controller hub and peripheral controller hub within a system chipset that is in communication with processor(s) 1602.

Embodiments presented herein can allow for a linear regulator with one or more features for improving the PSRR to identify and correct voltage noise within a circuit.

Various embodiments can be described by the following clauses:

1. A computer-implemented method, comprising:
   assigning an identifier to one or more data sources, the identifier of the one or more data sources being made available via a control bus;
   receiving a request to connect a data stream associated, with a data source of the one or more data sources with an available workload object of a plurality of workload objects that is communicatively coupled with the control bus;

obtaining the identifier of the one or more data sources and an identifier associated with a particular workload object;
populating a routing table with the identifier of the one or more data sources and the identifier associated with the particular workload object;
performing a computing operation, using the data stream, by the particular workload object; and
updating the routing table with a second identifier corresponding to a result generated by the particular workload object.

2. The computer-implemented method of clause 1, further comprising:
   receiving a second request to connect to the result, the second request associated with a second workload object; and
   providing routing information based on the second identifier of the result.

3. The computer-implemented method of clause 1, wherein at least one data source of the one or more data sources is a streaming data source.

4. The computer-implemented method of clause 1, further comprising:
   receiving a third identifier of a second data source of the one or more data sources;
   determining the third identifier is associated with an entry in the routing table; and
   replacing the third identifier with an associated identifier for the entry in the routing table.

5. The computer-implemented method of clause 1, further comprising:
   receiving a delete request from a workload object associated with the data stream;
   determining one or more other workload objects are connected to the data stream; and
   maintaining routing information for the data stream.

6. The computer-implemented method of clause 1, further comprising:
   identifying the one or more data sources; and
   writing identification information for the one or more data sources to the control bus.

7. A processor comprising:
   one or more processing units to:
     store a data stream identifier of a data stream in a routing table responsive to an activation message for the data stream;
     receive a request for the data stream;
     identify an available workload object based on the data stream identifier, responsive to the request;
     generate a result identifier for an output of the workload object; and
     store the result identifier in the routing table, wherein the output is accessible based on the result identifier.

8. The processor of clause 7, wherein the activation message is provided via a communication bus from a data stream initiator.

9. The processor of clause 7, wherein the one or more processing units are further to:
   determine a capacity for at least one workload object is at or above a threshold; and
   in response to the determination that the capacity of the at least one workload object is at or above the threshold, initialize a new workload process.

10. The processor of clause 7, wherein the one or more processing units are further to:
   receive a second request, from a second workload object, to connect to the result; and
   provide, to the second workload object, routing information based on the result identifier.

11. The processor of clause 7, wherein the one or more circuits are further to:
   receive a third identifier for a second data stream;
   determine the third identifier is associated with an entry in the routing table; and
   replace the third identifier with an associated identifier for the entry in the routing table.

12. The processor of clause 7, wherein the one or more circuits are further to:
   receive a delete request from the worker associated with the data stream;
   determine one or more other workers are connected to the data stream; and
   maintain routing information for the data stream.

13. The processor of clause 7, wherein the processor is included in a system comprising at least one of:
   a system for performing simulation operations;
   a system for performing simulation operations to test or validate autonomous machine applications;
   a system for performing digital twin operations;
   a system for performing light transport simulation;
   a system for rendering graphical output;
   a system for performing deep learning operations;
   a system implemented using an edge device;
   a system for generating or presenting virtual reality (VR) content;
   a system for generating or presenting augmented reality (AR) content;
   a system for generating or presenting mixed reality (MR) content;
   a system incorporating one or more Virtual Machines (VMs);
   a system implemented at least partially in a data center;
   a system for performing hardware testing using simulation;
   a system for synthetic data generation;
   a system for performing generative AI operations;
   a system for performing operations using a large language model (LLM);
   a system for performing operations using a video language model (VLM)
   a collaborative content creation platform for 3D assets; or
   a system implemented at least partially using cloud computing resources.

14. A system, comprising:
   one or more processing units to update a routing table with identifying information associated with output received from a workload object that requested access to a data stream, of a plurality of data streams from a plurality of data sources, using identifying information for the data stream.

15. The system of clause 14, wherein the identifying information for the data stream is a stream identifier and wherein the output is associated with a result identifier.

16. The system of clause 15, wherein the data stream is requested through a request with a specific format, the request including the stream identifier.

17. The system of clause 15, wherein the one or more processing units are further to:
   receive a second request, from a second workload object, to connect to the output; and
   provide, to the second workload object, routing information based on the result identifier.

18. The system of clause 15, wherein the one or more processing units are further to:
   receive a third identifier for a second data stream;
   determine the third identifier is associated with an entry in the routing table; and
   replace the third identifier with an associated identifier for the entry in the routing table.

19. The system of clause 14, wherein the one or more processing units are further to:
   determine a capacity for the workload object is at or above a threshold; and
   in response to the determination that the capacity of the workload object is at or above the threshold, initialize a new workload process.

20. The system of clause 14, wherein the system comprises at least one of:
   a system for performing simulation operations;
   a system for performing simulation operations to test or validate autonomous machine applications;
   a system for performing digital twin operations;
   a system for performing light transport simulation;
   a system for rendering graphical output;
   a system for performing deep learning operations;
   a system implemented using an edge device;
   a system for generating or presenting virtual reality (VR) content;
   a system for generating or presenting augmented reality (AR) content;
   a system for generating or presenting mixed reality (MR) content;
   a system incorporating one or more Virtual Machines (VMs);
   a system implemented at least partially in a data center;
   a system for performing hardware testing using simulation;
   a system for synthetic data generation;
   a system for performing generative AI operations;
   a system for performing operations using a large language model (LLM);
   a system for performing operations using a video language model (VLM)
   a collaborative content creation platform for 3D assets; or
   a system implemented at least partially using cloud computing resources.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 10, computer programs in form of machine-readable executable code or computer control logic algorithms are stored in main memory 1004 and/or secondary storage. Computer programs, if executed by one or more processors, enable computer system 1000 to perform various functions in accordance with at least one embodiment. In at least one embodiment, main memory 1004, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous FIGS. 1-6 are implemented in context of CPU 1002, parallel processing system 1012, an integrated circuit capable of at least a portion of capabilities of both CPU 1002, parallel processing system 1012, a chipset (e.g., a group of integrated circuits designed to work and sold as a unit for performing related functions, etc.), and/or any suitable combination of integrated circuit(s).

In at least one embodiment, architecture and/or functionality of various previous FIGS. 1-6 are implemented in context of a general computer system, a circuit board system, a game console system dedicated for entertainment purposes, an application-specific system, and more. In at least one embodiment, computer system 1000 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 1012 includes, without limitation, a plurality of parallel processing units ("PPUs") 1014 and associated memories 1016. In at least one embodiment, PPUs 1014 are connected to a host processor or other peripheral devices via an interconnect 1018 and a switch 1020 or multiplexer. In at least one embodiment, parallel processing system 1012 distributes computational tasks across PPUs 1014 which can be parallelizable—for example, as part of distribution of computational tasks across multiple graphics processing unit ("GPU") thread blocks. In at least one embodiment, memory is shared and accessible (e.g., for read and/or write access) across some or all of PPUs 1014, although such shared memory may incur performance penalties relative to use of local memory and registers resident to a PPU 1014. In at least one embodiment, operation of PPUs 1014 is synchronized through use of a command such as _syncthreads( ), wherein all threads in a block (e.g., executed across multiple PPUs 1014) to reach a certain point of execution of code before proceeding.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accel-erator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as one VPL, is a library that is utilized for accelerating video processing in one or more applications. In at least one embodiment, one VPL implements various video decoding, encoding, and processing functions. In at least one embodiment, one VPL implements various functions for media pipelines on CPUs, GPUs, and other accelerators. In at least one embodiment, one VPL implements device discovery and selection in media centric and video analytics workloads. In at least one embodiment, one VPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, any application programming interface (API) described herein is compiled into one or more instructions, operations, or any other signal by a compiler, interpreter, or other software tool. In at least one embodiment, compilation comprises generating one or more machine-executable instructions, operations, or other signals from source code. In at least one embodiment, an API compiled into one or more instructions, operations, or other signals, when performed, causes one or more processors such as graphics processor 1310, graphics processor 1340, graphics core 1400, parallel processor 1500, or any other logic circuit further described herein to perform one or more computing operations.

It should be noted that, while example embodiments described herein may relate to a CUDA programming model, techniques described herein can be utilized with any suitable programming model, such HIP, oneAPI, and/or variations thereof.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   assigning a source identifier to one or more data sources, the source identifier of the one or more data sources being made available via a control bus;
   receiving a request to connect a data stream, associated with a data source of the one or more data sources, with an available workload object of a plurality of workload objects, the available workload object being communicatively coupled with the control bus;
   obtaining the source identifier of the one or more data sources and an object identifier associated with a particular workload object of the plurality of workload objects;
   populating a routing table with the source identifier of the one or more data sources and with the object identifier associated with the particular workload object;
   performing a computing operation, using the data stream, by the particular workload object; and
   updating the routing table with an additional identifier corresponding to a result generated by the particular workload object.

2. The computer-implemented method of claim 1, further comprising:
   receiving a second request to connect to the result, the second request associated with a second workload object; and
   providing routing information based on the additional identifier corresponding to the result.

3. The computer-implemented method of claim 1, wherein at least one data source of the one or more data sources is a streaming data source.

4. The computer-implemented method of claim 1, further comprising:
   receiving a third identifier of a second data source of the one or more data sources;

determining the third identifier is associated with an entry in the routing table; and
replacing the third identifier with an associated identifier for the entry in the routing table.

5. The computer-implemented method of claim 1, further comprising:
   receiving a delete request from a workload object associated with the data stream;
   determining one or more other workload objects are connected to the data stream; and
   maintaining routing information for the data stream.

6. The computer-implemented method of claim 1, further comprising:
   identifying the one or more data sources; and
   writing identification information for the one or more data sources to the control bus.

7. A processor comprising:
   one or more processing units to:
      store, in a routing table, a data stream identifier of a data stream, responsive to an activation message for the data stream;
      receive a request for the data stream;
      identify an available workload object based on the data stream identifier, responsive to the request;
      generate a result identifier for an output of the available workload object; and
      store the result identifier in the routing table, wherein the output is accessible based on the result identifier.

8. The processor of claim 7, wherein the activation message is provided via a communication bus from a data stream initiator.

9. The processor of claim 7, wherein the one or more processing units are further to:
   determine a capacity for at least one workload object is at or above a threshold; and
   in response to the determination that the capacity of the at least one workload object is at or above the threshold, initialize a new workload process.

10. The processor of claim 7, wherein the one or more processing units are further to:
   receive a second request, from a second workload object, to connect to the result; and
   provide, to the second workload object, routing information based on the result identifier.

11. The processor of claim 7, wherein the one or more circuits are further to:
   receive a third identifier for a second data stream;
   determine the third identifier is associated with an entry in the routing table; and
   replace the third identifier with an associated identifier for the entry in the routing table.

12. The processor of claim 7, wherein the one or more circuits are further to:
   receive a delete request from a worker associated with the data stream;
   determine one or more other workers are connected to the data stream; and
   maintain routing information for the data stream.

13. The processor of claim 7, wherein the processor is included in a system comprising at least one of:
   a system for performing simulation operations;
   a system for performing simulation operations to test or validate autonomous machine applications;
   a system for performing digital twin operations;
   a system for performing light transport simulation;
   a system for rendering graphical output;
   a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a system for performing generative AI operations;

a system for performing operations using a large language model (LLM);

a system for performing operations using a video language model (VLM)

a collaborative content creation platform for 3D assets; or a system implemented at least partially using cloud computing resources.

14. A system, comprising:

one or more processing units to update a routing table with identification information associated with output received from a workload object, the workload object having requested access, to a data stream of a plurality of data streams from a plurality of data sources, using identifying information for the data stream.

15. The system of claim 14, wherein the identification information for the data stream is a stream identifier and wherein the output is associated with a result identifier.

16. The system of claim 15, wherein the data stream is requested through a request with a specific format, the request including the stream identifier.

17. The system of claim 15, wherein the one or more processing units are further to:

receive a second request, from a second workload object, to connect to the output; and provide, to the second workload object, routing information based on the result identifier.

18. The system of claim 15, wherein the one or more processing units are further to:

receive a third identifier for a second data stream;

determine the third identifier is associated with an entry in the routing table; and replace the third identifier with an associated identifier for the entry in the routing table.

19. The system of claim 14, wherein the one or more processing units are further to:

determine a capacity for the workload object is at or above a threshold; and in response to the determination that the capacity of the workload object is at or above the threshold, initialize a new workload process.

20. The system of claim 14, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a system for performing generative AI operations;

a system for performing operations using a large language model (LLM);

a system for performing operations using a video language model (VLM)

a collaborative content creation platform for 3D assets; or a system implemented at least partially using cloud computing resources.

* * * * *